US007113971B1

(12) United States Patent
Ohi et al.

(10) Patent No.: US 7,113,971 B1
(45) Date of Patent: Sep. 26, 2006

(54) COMMUNICATION METHOD AND APPARATUS, SERVER AND CLIENT ON NETWORK, AND PROGRAM CODES REALIZING COMMUNICATION THEREOF

(75) Inventors: Hirokazu Ohi, Machida (JP); Yasutomo Suzuki, Yokohama (JP); Tadashi Yamakawa, Yokohama (JP); Mamoru Sato, Tokyo (JP); Yasuhiro Okuno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/904,860

(22) Filed: Aug. 1, 1997

(30) Foreign Application Priority Data

Aug. 5, 1996 (JP) .................................. 8-205954
Nov. 29, 1996 (JP) .................................. 8-320562

(51) Int. Cl.
*G06F 15/16* (2006.01)
*H04N 5/232* (2006.01)
(52) U.S. Cl. .................................. 709/203; 348/211.3
(58) Field of Classification Search ................ 709/200, 709/203, 208, 219; 710/5; 707/500; 348/212, 348/64, 114, 211, 213, 552, 143, 211.99, 348/211.3; 700/14, 65, 83, 84, 85, 86, 87, 700/88, 89
See application file for complete search history.

(56) References Cited

U.S. PATENT DOCUMENTS

| | | | | |
|---|---|---|---|---|
| 5,111,288 A | * | 5/1992 | Blackshear | 348/143 |
| 5,517,236 A | * | 5/1996 | Sergeant et al. | 348/143 |
| 5,544,046 A | * | 8/1996 | Niwa | 700/159 |
| 5,737,560 A | * | 4/1998 | Yohanan | 715/847 |
| 5,802,518 A | * | 9/1998 | Karaev et al. | 707/9 |

| | | |
|---|---|---|
| 6,209,048 B1 | 3/2001 | Wolff |
| 2001/0045983 A1 | 11/2001 | Okazaki et al. |

FOREIGN PATENT DOCUMENTS

| | | |
|---|---|---|
| JP | 01-218244 | 8/1989 |
| JP | 04-068977 | 3/1992 |
| JP | 4-334165 | 11/1992 |
| JP | 5-035622 | 2/1993 |
| JP | 5-300510 | 11/1993 |
| JP | 6-012347 | 1/1994 |
| JP | 6-121066 | 4/1994 |

(Continued)

OTHER PUBLICATIONS

Kurk et al. "WebCAM + the story behind WebCam/WebCam +", http://entcweb.tamu.edu/webcam/info.htm (retreived Mar. 26, 1999) Jul. 1996.*

(Continued)

*Primary Examiner*—Glenton B. Burgess
*Assistant Examiner*—Sean Reilly
(74) *Attorney, Agent, or Firm*—Morgan & Finnegan, LLP

(57) ABSTRACT

An end user is provided with an environment to easily remote-control a video camera via a general network such as the Internet. For this purpose, on a client side, the content of camera control is described in file-transfer protocol description, and the description is transferred to a camera server on the Internet via a browser. The camera server interprets the description, controls a camera in accordance with the designated content, to perform image sensing, and returns the obtained video image as the content of a file to the client. The client performs various controls while observing the video image. When a desired angle has been found, the client instructs to register the angle in a bookmark, then angle information displayed at that time is registered. Thereafter, when the user of the client can see the video image obtained on the same image-sensing conditions by merely select-designating the angle information registered in the bookmark.

26 Claims, 32 Drawing Sheets

FOREIGN PATENT DOCUMENTS

| | | |
|---|---|---|
| JP | 06-165167 | 6/1994 |
| JP | 6-197336 | 7/1994 |
| JP | 7-015537 | 1/1995 |
| JP | 07-059000 | 3/1995 |
| JP | 07-135594 | 5/1995 |
| JP | 07-162658 | 6/1995 |
| JP | 7-221843 | 8/1995 |
| JP | 07-288621 | 10/1995 |
| JP | 8-44643 | 2/1996 |
| JP | 8-069436 | 3/1996 |
| JP | 3029839 | 7/1996 |
| JP | 08-237532 | 9/1996 |
| JP | 9-325925 | 12/1997 |
| JP | 10-508964 | 9/1998 |
| WO | WO 96/15505 | 5/1996 |

OTHER PUBLICATIONS

Deep et al. "Developing CGI Applications with Perl" Wiley Computer Publishing pp. 68-70, 1996.*

Goldberg et al. "Beyond the Web: Excavating the Real World Via Mosaic" The Mercury Project, http://www.usc.edu/dept/raiders/paper (retreived May 2, 1996)1994.*

Goldberg et al. "Tele-Garden Info" http://telegarden.acc.at/cgi-bin/knapsack/html/info.html (retrieved Sep. 18, 1997) 1996.*

"Disk Drive with Embedded Hyper-Text Markup Language Server" IBM Technical Disclosure Bulletin v.38 n. 12 Dec. 1995.*

Lee, Berners T, "Hypertext Markup Language—2.0", RFC 1866, Nov. 1995.*

Lee, Berners T., "Uniform Resource Locators (URL)", RFC 1738, Dec. 1994.*

IBM TDB NN9605149 "Mapping Protocol to Uniform Resource Locators," May 1, 1996.*

Goldberg et al. "Beyond the Web: Excavating the Real World Via Mosaic", 1994, retrieved May 2, 1996 from http://www.usc.edu/dept/raiders/paper/.*

Japanese Final Office Action dated Jun. 13, 2005.

The Questioning dated Jul. 11, 2005 of basic Japanese Patent Application No. 08-205954.

Jun'ichi Mineo, "Design and Implementation on Telemetric Monitoring System Using Network Connected Automatic Tracking Videocameras", IPSJ SIG Notes, Information Processing Society of Japan, May 17, 1996, vol. 96, No. 40, 96-DPS-76, pp. 115-120 (English abstract, p. 115).

* cited by examiner

FIG.3

| IMAGE-SENSING TIME | ACCEPTANCE CODE | IMAGE-SENSING CONDITION | IMAGE FORMAT |
|---|---|---|---|
| 1996.7.6.13.15 | 12543 | P25T0Z3 | gif |

FIG.4

| ACCEPTANCE CODE | IMAGE FORMAT | IMAGE DATA |
|---|---|---|
| 12543 | gif | 0100011101001001...... |

FIG.6

| IMAGE-SENSING TIME | END TIME | INTERVAL TIME | ACCEPTANCE CODE | IMAGE-SENSING CONDITION | IMAGE FORMAT |
|---|---|---|---|---|---|
| 1996.7.6.13.15 | 1996.7.6.13.45 | 15 | 12543 | P25T0Z3 | gif |

FIG.17

| ACCEPTANCE CODE | | IMAGE FORMAT | IMAGE DATA |
|---|---|---|---|
| 12543 | 1 | gif | 0100011101001001...... |
| 12543 | 2 | gif | 0010010011100...... |
| 12543 | 3 | gif | 00110...... |
| | | | |

FIG.18

| IMAGE-SENSING TIME | ACCEPTANCE CODE | IMAGE-SENSING CONDITION | IMAGE FORMAT |
|---|---|---|---|
| 1996.7.6.13.15 | 12543 | 1 | P25T0Z3 | gif |
| 1996.7.6.13.15 | 12543 | 2 | P30T0Z3 | gif |
| 1996.7.6.13.15 | 12543 | 3 | P35T0Z3 | gif |
| | | | | |

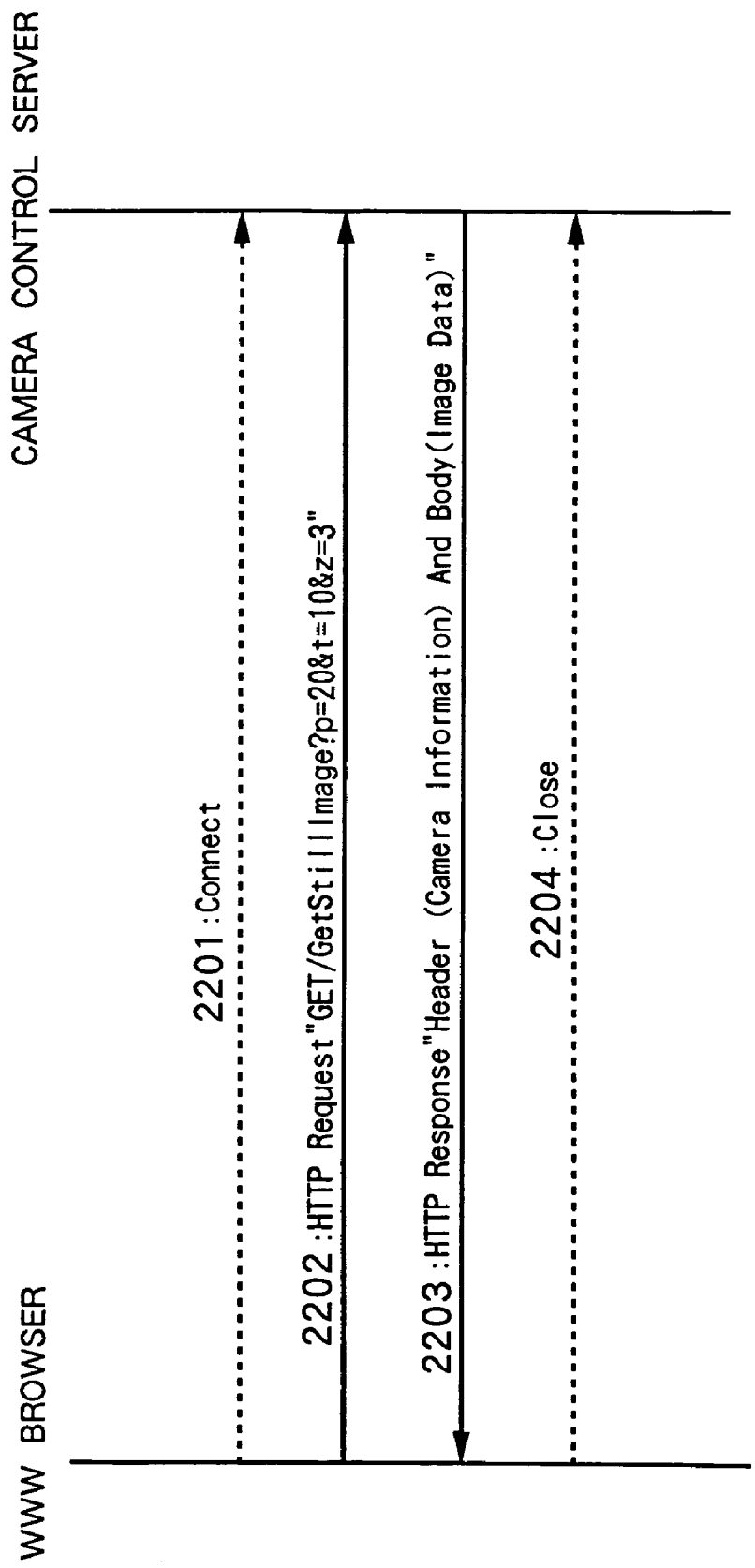

FIG.21

```
HTTP/1.0 200 OK (CR/LF)
Data : Thu, 24 Oct 1996  11:14:25GMT (CR/LF)
Server : Camera Control Server (CR/LF)
Content-type : image/jpeg (CR/LF)
Content-length : 5074 (CR/LF)
Camera-location-pan-tilt-zoom : 20, 10, 3 (CR/LF)
Camera-backlight : ON (CR/LF)
Camera-focus : xxx (CR/LF)
Camera-iris : yyy (CR/LF)
Camera-controllimit-pan-max : 50 (CR/LF)
Camera-controllimit-pan-min : -50 (CR/LF)
Camera-controllimit-tilt-max : 20 (CR/LF)
Camera-controllimit-tilt-min : -20 (CR/LF)
Camera-controllimit-zoom-max : 8 (CR/LF)
Camera-controllimit-zoom-min : 1 (CR/LF)
(CR/LF)
(IMAGE DATA)
```

HEADER

BODY

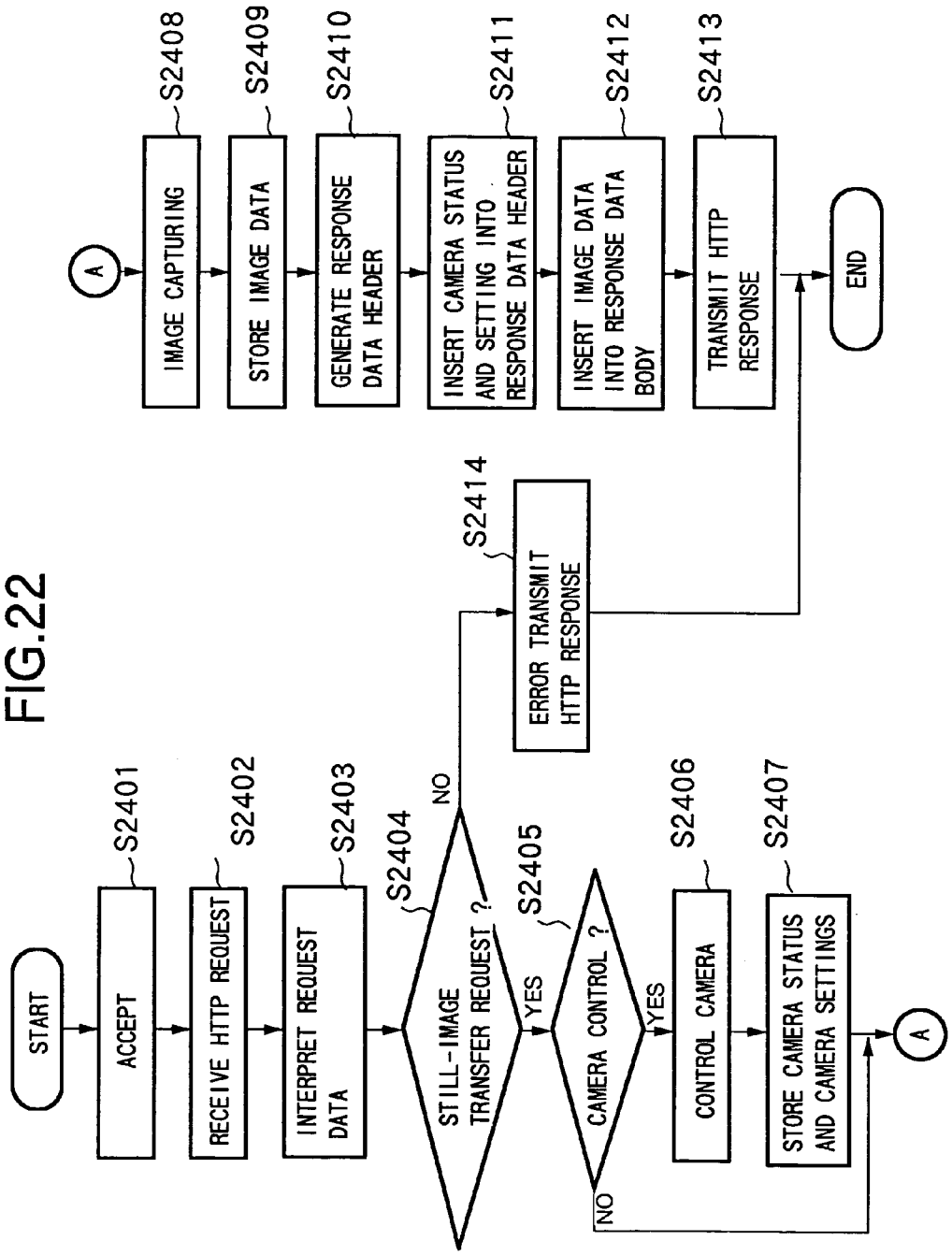

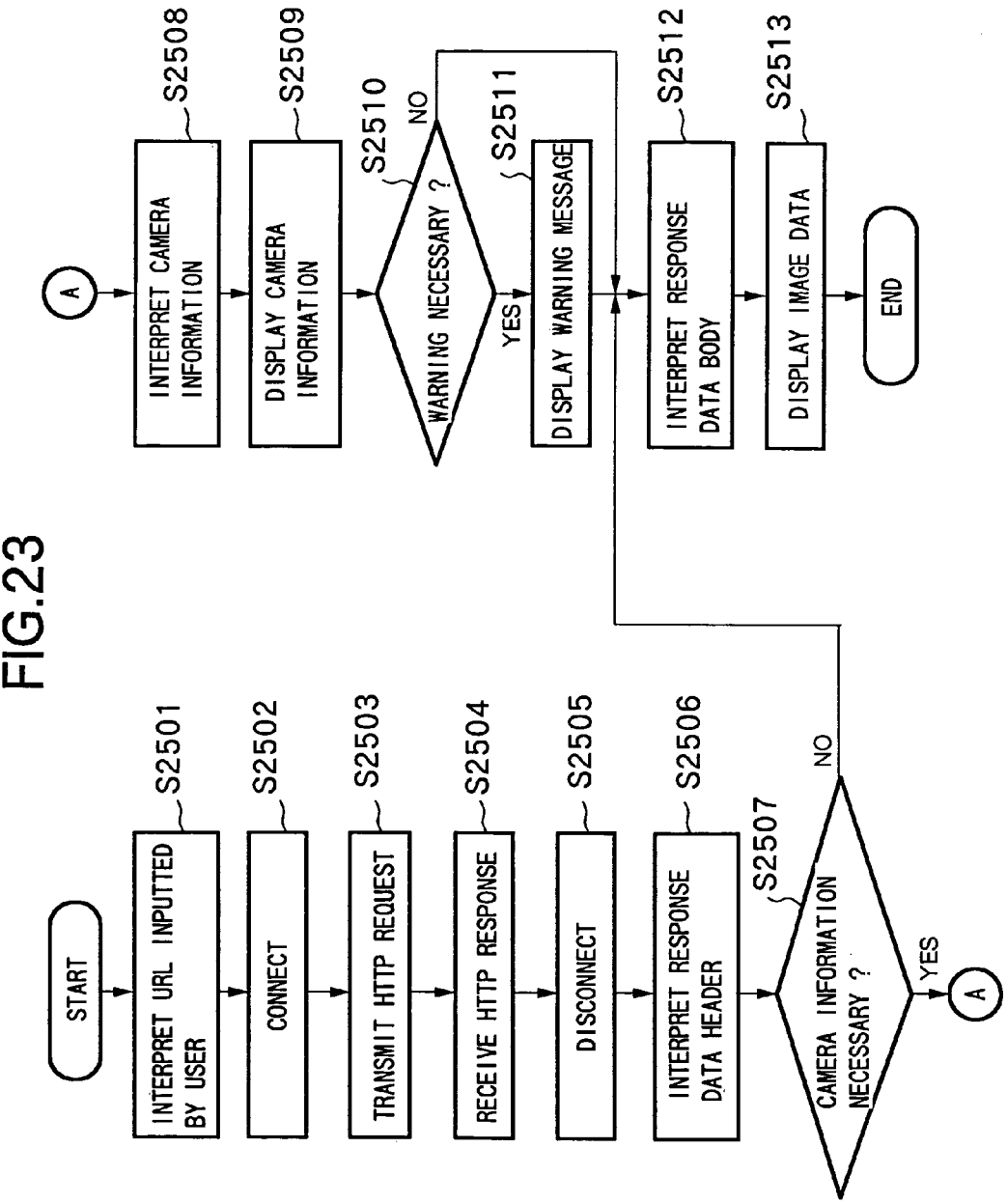

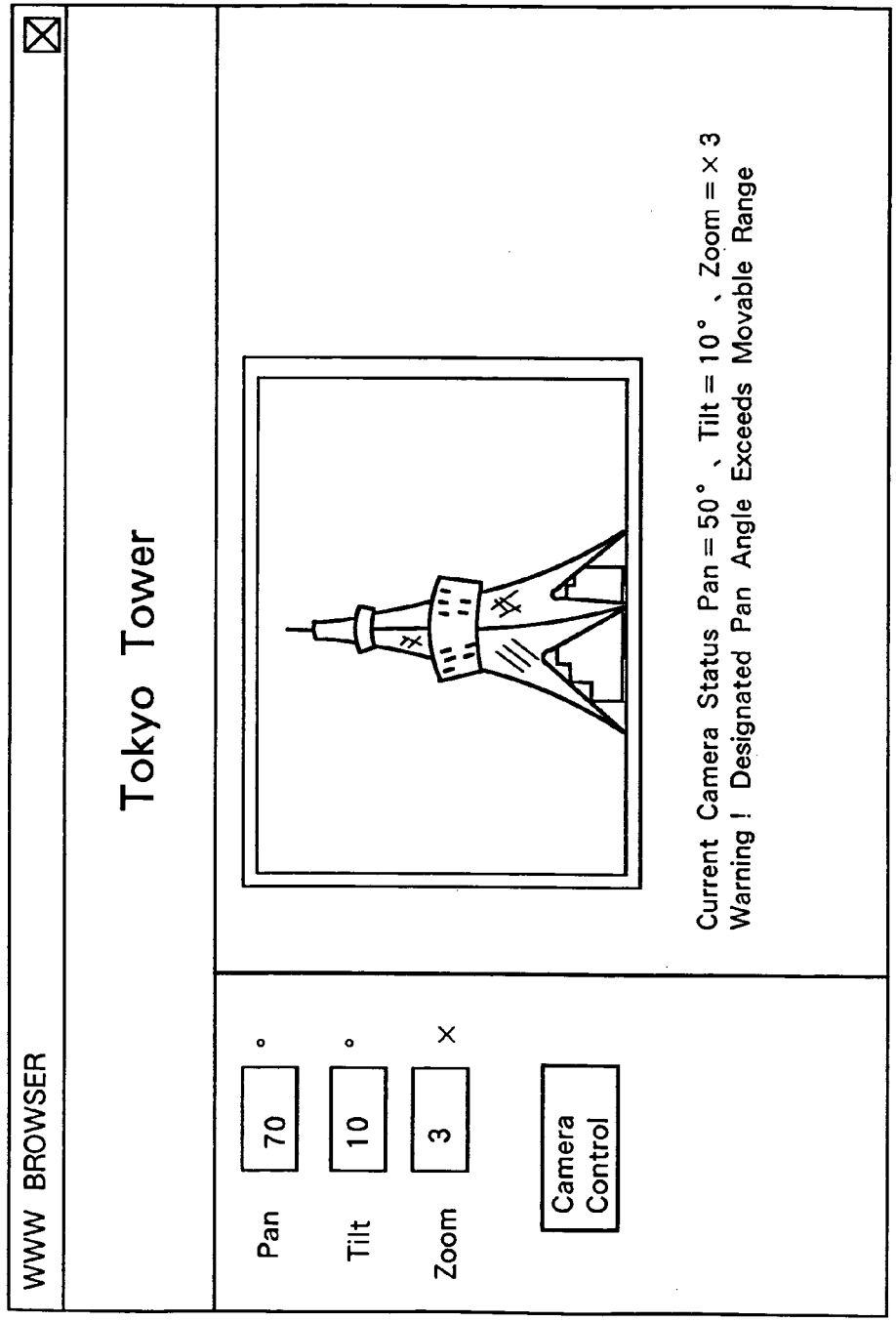

FIG.28

```
HTTP/1.0 200 OK (CR/LF)
Data : Thu, 24 Oct 1996 11 : 14 : 25GMT (CR/LF)
Server : Camera Control Server (CR/LF)
Content - type : text/plain (CR/LF)
Content - length : 293 (CR/LF)
(CR/LF)
Camera - location - pan - tilt - zoom : 20, 10, 3 (CR/LF)
Camera - backlight : ON (CR/LF)
Camera - focus : xxx (CR/LF)
Camera - iris : yyy (CR/LF)
Camera - controllimit - pan - max : 50 (CR/LF)
Camera - controllimit - pan - min : -50 (CR/LF)
Camera - controllimit - tilt - max : 20 (CR/LF)
Camera - controllimit - tilt - min : -20 (CR/LF)
Camera - controllimit - zoom - max : 8 (CR/LF)
Camera - controllimit - zoom - min : 1 (CR/LF)
```

HEADER

BODY

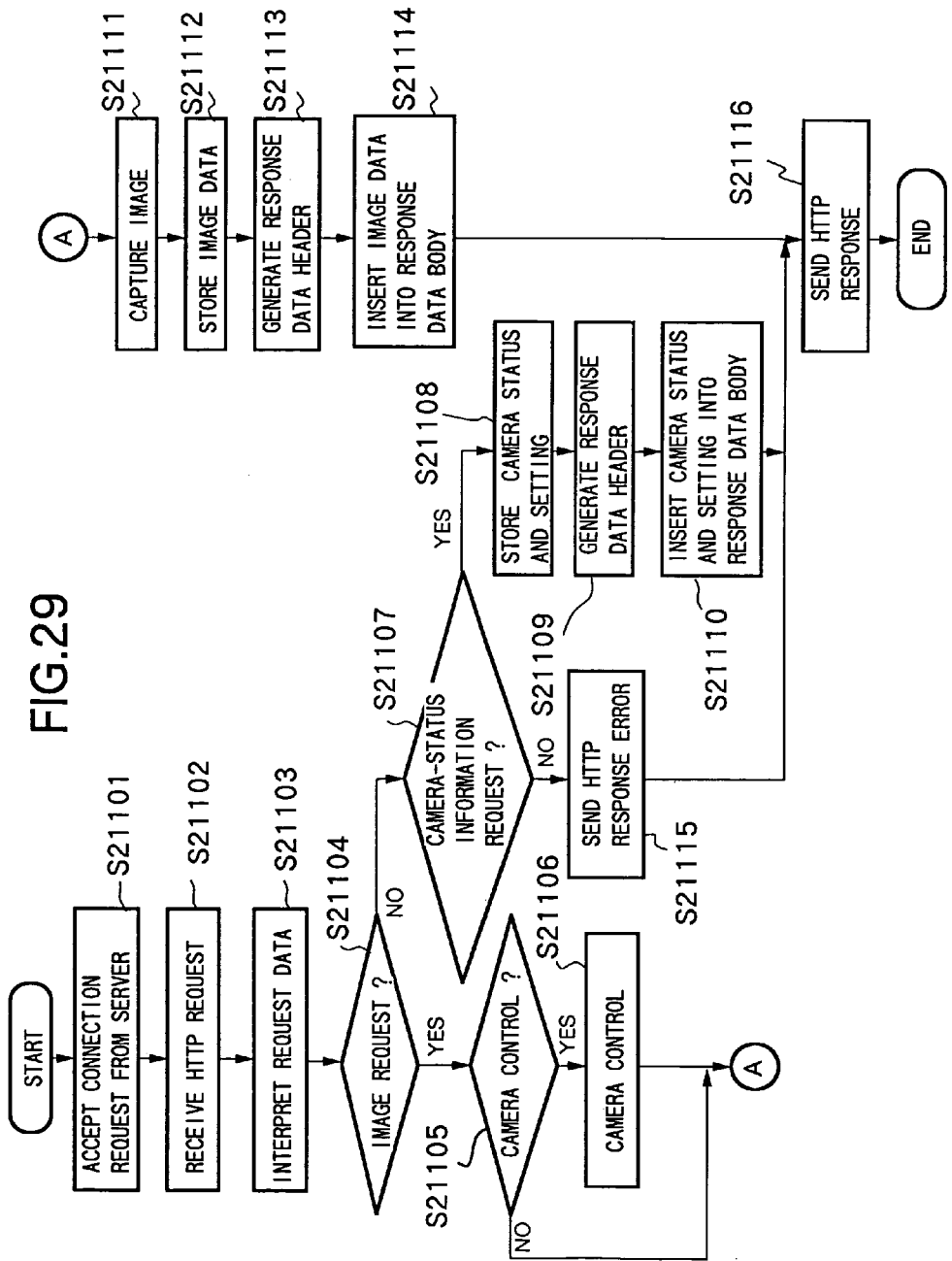

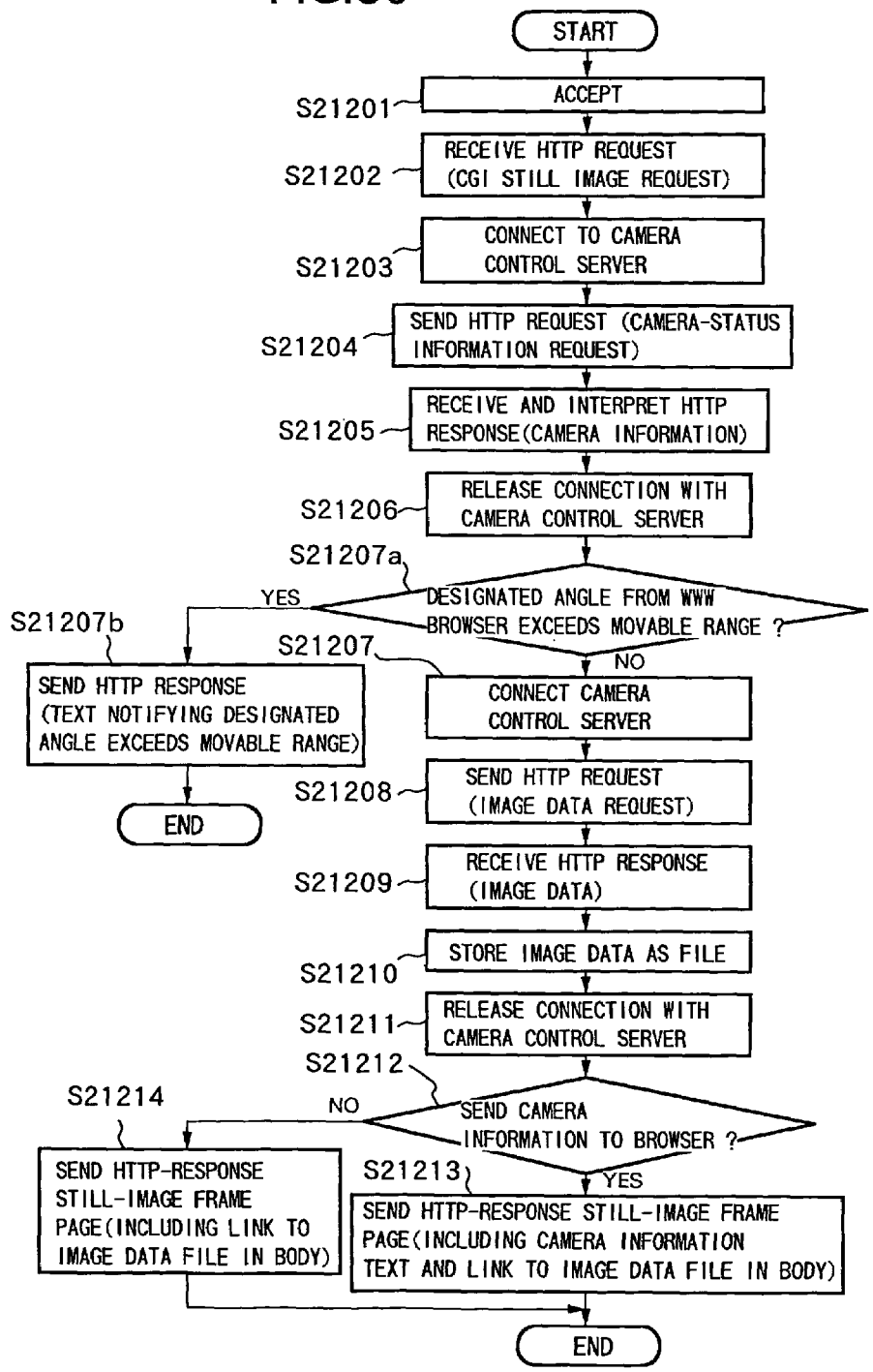

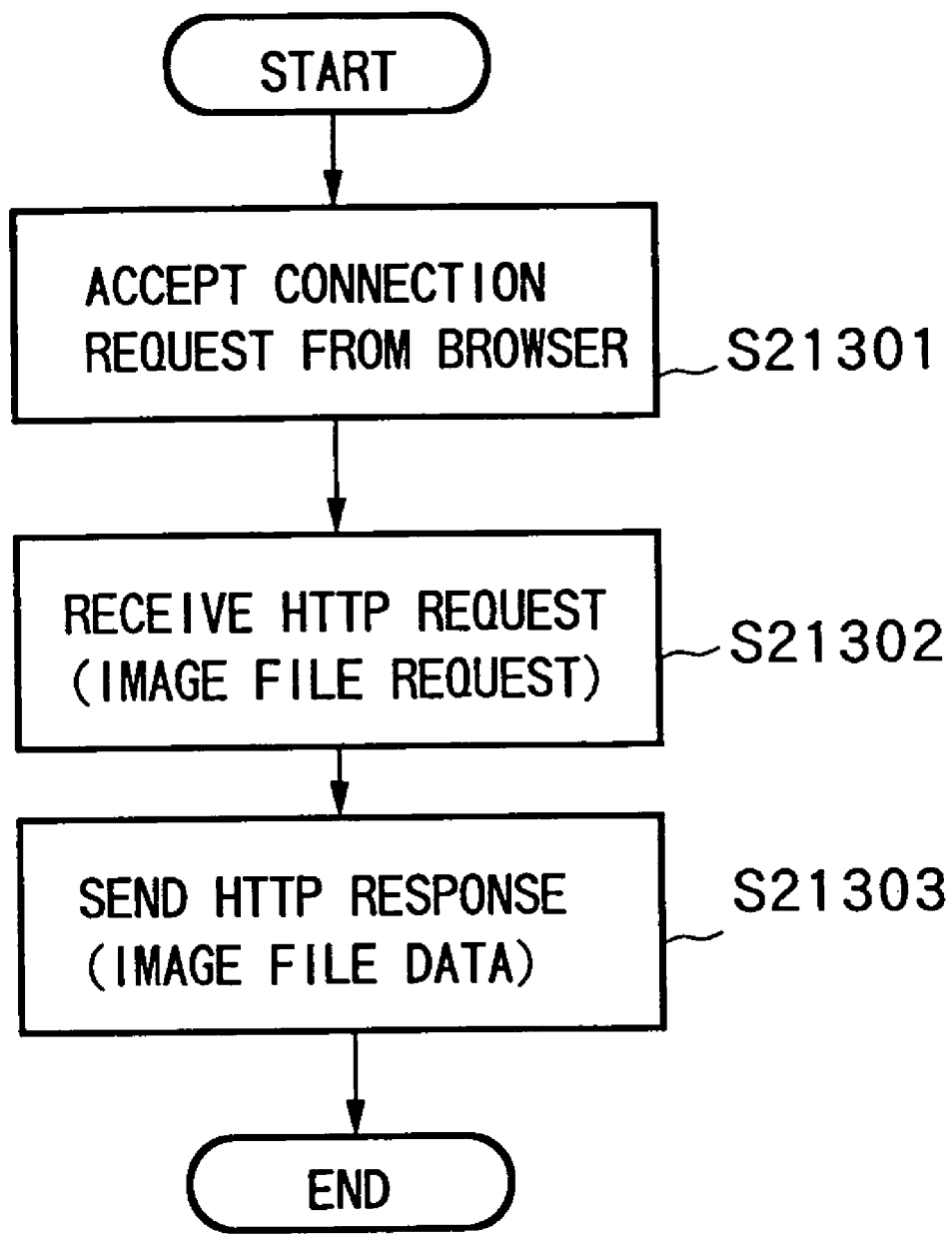

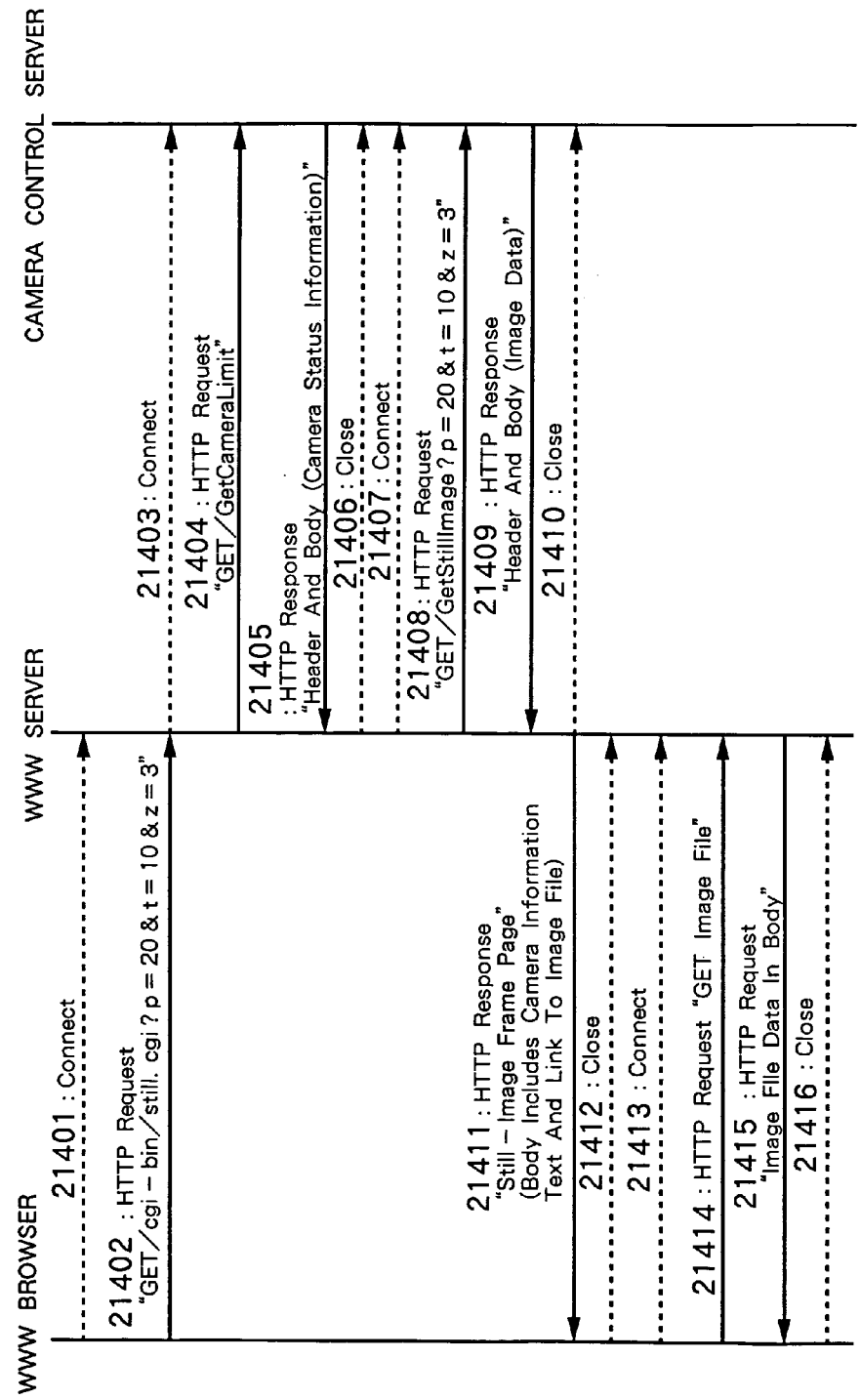

COMMUNICATION METHOD AND APPARATUS, SERVER AND CLIENT ON NETWORK, AND PROGRAM CODES REALIZING COMMUNICATION THEREOF

BACKGROUND OF THE INVENTION

This invention relates to a communication method and apparatus, and a storage medium for storing program codes for realizing the communication method.

A camera control system for controlling a camera (e.g., panning, tilting and zooming of the camera) from a remote place is widely known.

In this system, even though camera control is performed via a network, a device for camera control and a client device do not depend on common specification but on unique specifications (e.g., protocol and control information).

However, in recent years, the Internet has been becoming popular with rapidity, and there is an increasing need from end users to see video images sensed by a camera at a remote place via the Internet.

One means to meet this requirement is to periodically store a video image sensed by a camera, in a file, into a storage device of a server connected to the camera, and transfer the file to a terminal (client) that has accessed the server. On the end-user side, a browser, for example, is activated so as to display the video image.

However, this merely displays the video image as sensed, but cannot meet requirements to see, e.g., the image in a view a little shifted to either side, the image in a wider view, or the image expanded within the view.

The present applicant has proposed a system in which a camera can be freely controlled via the Internet.

However, there is yet room for improvement in this system.

SUMMARY OF THE INVENTION

The present invention has been made in consideration of the above situation, and has its object to provide a communication method and apparatus, and a browser, further, a server and a client, which provides an end user with more preferable environment to remote-control a video camera via a general network such as the Internet.

According to the present invention, the foregoing object is attained by providing a communication method comprising: an address-storing step of storing addresses of a plurality of object sites into a memory; a determination step of determining whether or not the object sites have image input means for performing operation based on given control information; an information-storing step of storing control information for the respective image input means of the plurality of object sites; a reading step of reading an address of a designated site from the addresses of the object sites stored in the memory; an access step of accessing the designated site of the address read at the reading step; and a transmission step of transmitting the control information to the site accessed at the access step, so as to control the image input means of the site.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of a data format in a reservation register according to the first embodiment;

FIG. 4 is a table showing an example of a management format for data stored in an image memory according to the first embodiment;

FIG. 6 is a table showing an example of a data format in the reservation register according to a third embodiment of the present invention;

FIG. 17 is a table showing an example of a data storage format in a reservation register according to the third embodiment;

FIG. 18 is a table showing an example of a data storage format in the reservation table according to the fifth embodiment;

FIG. 20 is a communication sequence chart showing a communication procedure between a WWW browser and a camera control server according to the seventh embodiment;

FIG. 21 is an example of the contents of a HTTP response sent by the camera control server according to the seventh embodiment;

FIG. 22 is a flowchart showing the operation of the camera control server according to the seventh embodiment;

FIG. 23 is a flowchart showing the operation of the WWW browser according to the seventh embodiment;

FIG. 27 is a display example of the WWW browser according to the seventh to a ninth embodiment of the present invention;

FIG. 28 is an example of the contents of the HTTP response sent by the camera control server according to the ninth embodiment;

FIG. 29 is a flowchart showing the operation of the camera control server according to the ninth embodiment;

FIG. 30 is a flowchart showing the operation of the WWW browser according to the ninth embodiment;

FIG. 31 is a flowchart showing the operation of the WWW browser according to the ninth embodiment; and FIG. 32 is a timing chart showing communication among the WWW browser, the WWW server and the camera control server according to the ninth embodiment.

DETAILED DESCRIPTION OF THE PREFERRED EMBODIMENTS

Preferred embodiments of the present invention will now be described in detail in accordance with the accompanying drawings.

First Embodiment

Figure 1:
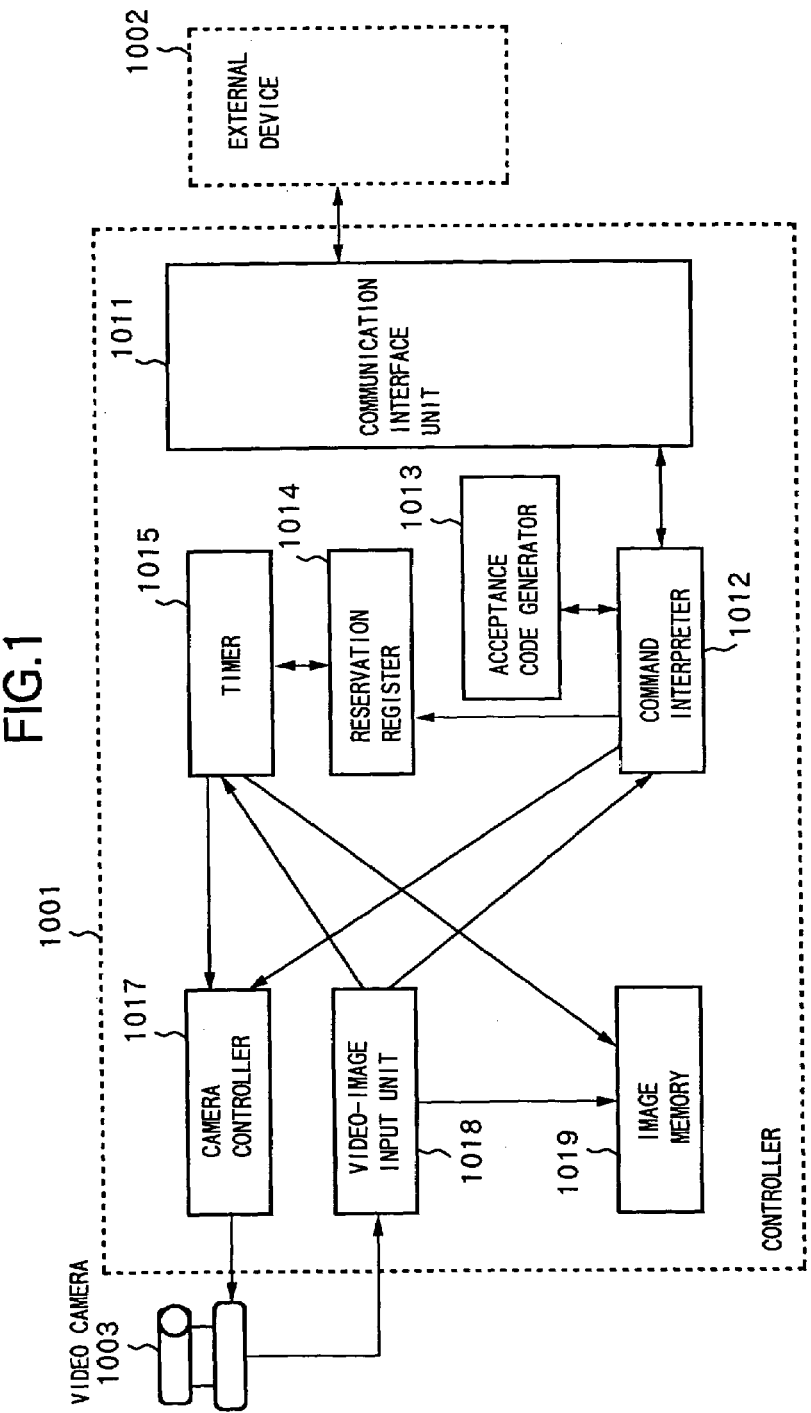
FIG. 1 is a block diagram showing the construction of a camera control apparatus according to a first embodiment of the present invention.

FIG. 1 is a block diagram showing the construction of a camera control apparatus according to a first embodiment of the present invention. In FIG. 1, reference numeral 1001 denotes a camera control apparatus, basically comprising a personal computer, for example. Numeral 1003 denotes a video camera (hereinafter simply referred to as "camera") as the object of the control by the camera control apparatus 1001. The content of control includes control of image-sensing condition such as panning, tilting, exposure and the like as well as zooming. For the control, the camera 1003 has a panhead (not shown). The camera 1003 and the camera control apparatus 1001 are connected to each other via, e.g., an RS232C interface generally used in a personal computer. Note that the video information obtained by the camera 1003 is outputted to the camera control apparatus 1001 via a dedicated cable which is specially provided.

The camera control apparatus 1001 has the following construction.

Numeral 1017 denotes a camera controller which outputs various control signals to control the camera 1003 via the above interface; 1018, a video-image input unit which inputs a video image sensed by the camera 1003 by using an image capture device or the like; 1011, a communication interface unit for the camera control apparatus 1001 to exchange information with another apparatus by using a network adapter or the like. Besides these resources, the camera control apparatus 1001 comprises a command interpreter 1012, which is realized as a program or memory data utilizing the various resources such as a CPU, a storage device and an auxiliary storage device of a computer, an acceptance code generator 1013, a timer 1015, an image memory 1019, and a reservation register 1014.

Numeral 1002 denotes an external device such as a WWW (World Wide Web) server or a WWW browser for communication by the HTTP (Hyper-Text Transfer Protocol) protocol. That is, a WWW browser sends a request in accordance with a URL (Uniform Resource Locator) indicating the storage destination of desired data to a WWW server, which is a storage of document data and image data. In response to the request, the WWW server returns corresponding document data or image data to the WWW browser.

In the present embodiment, the communication interface unit 1011 uses a method realized by the WWW servers. That is, communication is performed by the HTTP protocol, and the camera control apparatus 1001 behaves as if it is a WWW server. This is possible by applying the WWW server's communication method to the present control apparatus.

Generally, when image data is pasted in a WWW document, the WWW document contains a "img" tag line as follows:

<img src="http://www.foo.co.jp/image001.gif">

(A character string in quotation marks " " is described as single string without any line-feed/new paragraph mark.)

This means that it is requested to transfer image data stored in a file "image001.gif" in a WWW server "www.foo.co.jp". The browser displays the image transferred from the WWW server on its display window image.

The present embodiment performs remote camera control while utilizing the above specification.

That is, in the present embodiment, a character string corresponding to the above file name is interpreted as a command. Specifically, camera-angle destination such as panning, tilting and zooming are represented by alphabets "P", "T" and "Z" respectively, then, respective control amounts are represented by numerical values. Note that if it is possible to control focusing of the camera, to perform the focus control, alphabet "I" may be added after "Z". Note that in the camera control apparatus of the present embodiment, autofocusing is performed, therefore, when this description is not included in the command, the focusing control is performed on the camera control apparatus side.

Assuming that the camera 1003 has a pan angle from −50° to 50°, a tilt angle from −20° to 20° and 1 to 8 times zooming, when image sensing is performed with a pan angle of 20°, a tilt angle of 5° and twice zooming, and the image is obtained as "gif" format image data, the description is as follows (note that the network address of the present camera control apparatus is cam.www.co.jp):

<img src="http://cam.www.co.jp/P20T5Z2.gif">

When the browser receives the HTML document including the above "img" tag line, the browser requires image data from the camera control apparatus 1001 which is a WWW server in this case.

When this request enters the camera control apparatus 1001 via the communication interface unit 1011, the command interpreter 1012 is activated to start interpretation of the request and processing of a response to the request.

Figure 11:
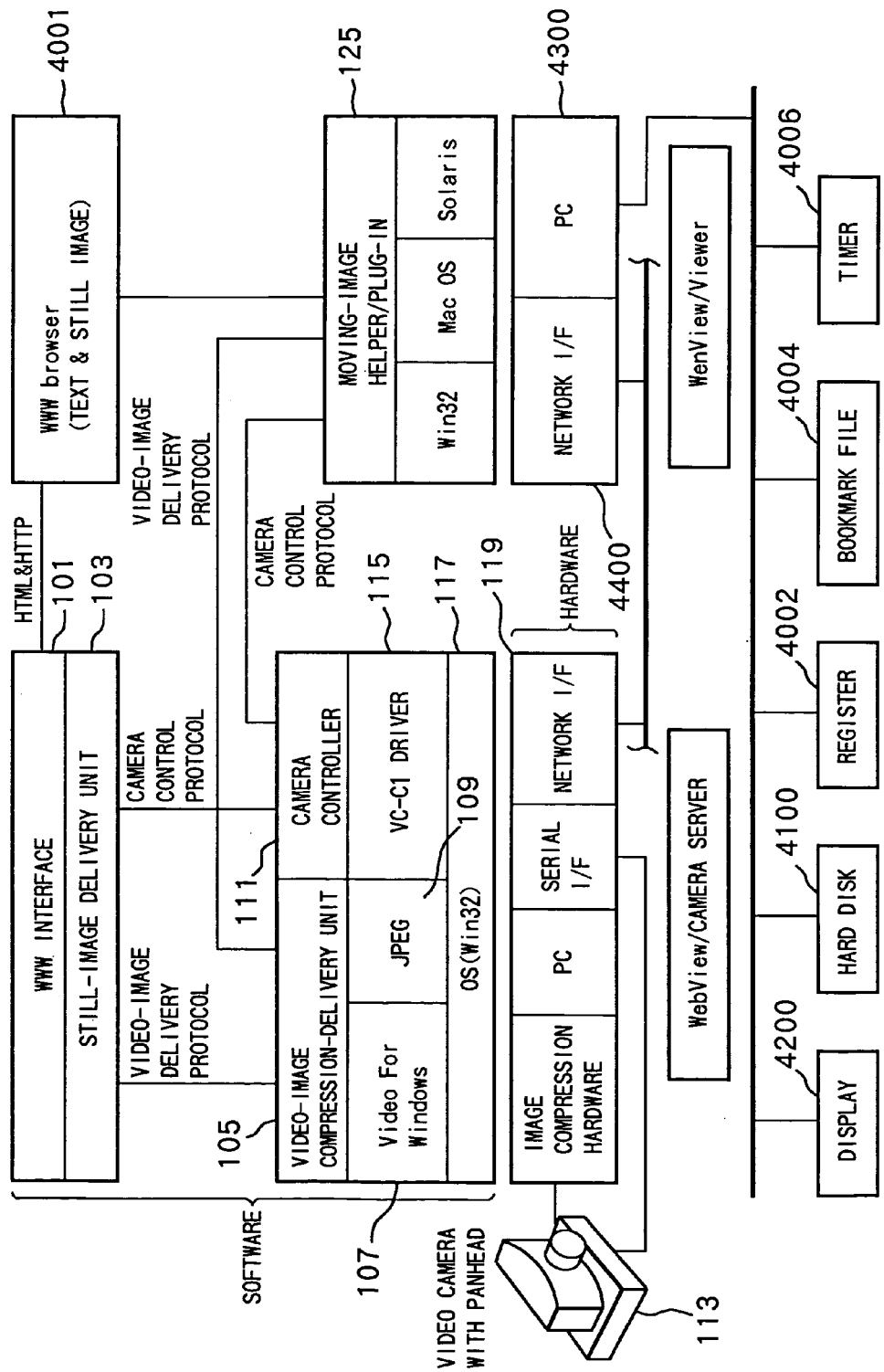
FIG. 11 is a block diagram showing the relation between software and hardware of the camera control apparatus and a client according to the sixth embodiment.

FIG. 11 shows the construction of a client (the side requiring a video image obtained by the camera) and that of the server (camera control apparatus 1001 in the present embodiment).

In FIG. 11, numeral 4001 denotes a browser software module; 4002, a register used by the software module 4001, for storing an address being accessed or to be accessed; and 4004, a bookmark file in which the above address http://cam.www.co.jp/P20T5Z2.gif, for example, is stored selectively by a user.

Numeral 4006 denotes a timer used when the site of an address set in processing to be described later has not been found, for measuring time until a point where warning display is performed; 4100, a storage medium such as a computer hard disk, in which the browser is stored accessable by the computer; 4200, a monitor display of the computer; 4300, a computer main body; and 4400, a communication board.

Further, numeral 101 denotes a WWW interface for the camera server. The WWW interface 101 operates in accordance with the HTTP protocol. Numeral 103 denotes a still-image delivery unit for delivering compressed image data, to be outputted from a video-image compression-delivery unit 105, as a file. In the present embodiment, the video-image compression-delivery unit 105 has a still-image compression function and a moving-image compression function.

As the still-image compression function, JPEG compression 109 is employed, and as the moving-image compression function, MPEG compression or H 261 compression is employed.

The compression functions are not limited to these methods. For example, as the moving-image compression, the same JPEG compression may be performed in frame units. In this case, it may be arranged such that the compression ratio in the respective still-image compression is different from that in the moving-image compression.

Numeral 111 denotes a camera controller which generates control signals for camera control such as panning, tilting and zooming for the camera 113. Numeral 115 denotes a driver which actually controls the camera 113.

Numeral 117 denotes an operating system (OS). In the present invention, the operating system is Windows.

Numeral 119 denotes a hardware construction of the client, including a network interface hardware and a personal computer PC. The construction of the computer PC will be described later. Numeral 125 denotes a software called a moving-image helper or a Plug-in. The moving-image helper/Plug-in 125, corresponding to various operating systems such as Windows, Mac OS, Solaris and the like, operates on any type of platform.

Note that as described above, the moving-image helper/Plug-in 125 continuously inputs images as a moving image, in accordance with a protocol different from the HTTP protocol.

Next, the processing when the above-mentioned request enters the cameral control apparatus 1001 via the communication interface unit 1011 will be described with reference to the flowchart of FIG. 2.

First, at step S101, the command described as a file name is interpreted. If the head of the command is "P", the command is recognized an image-sensing command, and the process proceeds to step S102.

Note that if step S102 is executable, i.e., the designated panning, zooming and the like can be performed, an acknowledgment is returned to the external device 1002 on the client side.

At this step, the camera 1003 is controlled by the camera controller 1017 based on the designated pan, tilt and zoom values. The obtained image is captured by the video-image input unit 1018, and converted into data of the designated image format, then sent to the external device 1002 requiring the image data, via the communication interface unit 1011. If the external device 1002 is a WWW server, the external device 1002 stores the image data, and transfers the image data to the WWW browser which is the initial request originator.

At this time, as the communication interface unit 1011 uses the HTTP protocol, content-type information and status information corresponding to the image format are added to the head of the image data. Then, the process ends.

Thus, the obtained video image is displayed in the HTML document as if it is image data stored in a file in the WWW server.

In the command interpretation at step S101, if the head of the request is "R", the command is recognized as a reservation command designating image-sensing time. Then, the process proceeds to step S105 via the determination of image-sensing condition at step S104.

The reservation command starts with "R"; then it continues with integers indicating year, month, day, hour, and minute, each terminated with a period, and with designation of panning, tilting and zooming as image-sensing condition; finally it ends with a name (an extension) indicating the image format. Note that if it has no image-sensing condition, the camera angle at the designated image-sensing time is employed.

For example, if video-image sensing is programmed with image-sensing time of 13:15 on Jul. 6, 1997, a pan angle of 25°, a tilt angle of 0° and a 3 times zooming, in gif format, the reservation is described as follows:

<img src="http://cam.www.co.jp/R1996.7.6.13.15.P25T0Z3.gif">

When the above reservation command is designated, a unique identification number is received as an acceptance code (code indicating that reservation is accepted) from the acceptance code generator 103 at step S105. The acceptance code may be a count value which is incremented by one (+1) at each request generated, or may be a numerical value indicating the designated time (year, month, date and time).

Then, at step S106, the acceptance code and information on the designated time, the image-sensing condition and the image format are registered into a storage device (not shown) of the reservation register 1014. At step S107, the acceptance code is returned via the communication interface unit 1011 to the external device 1002 which issued the reservation command, further, toward the end user.

Note that at this time, to indicate that the response is an acceptance code, content-type information and status information are added to the head of the code. Then the process ends.

However, if an HTML document including such image-sensing reservation is simply generated but a general WWW browser is used to display the obtained image, the acceptance code instead of image data is returned and an image is not displayed.

However, if image-sensing is reserved with respect to the camera control apparatus 1001 by using a CGI (Common Gate Interface) program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

That is, when the designated time registered in the reservation register 1014 has come, the camera control apparatus 1001 controls the camera 1003 at the registered camera angle to perform the programmed image sensing, and stores the obtained image data in the designated format with an appropriate name, e.g., an acceptance code, as a file name, into the image memory 1019. Thereafter, when an image read command (including an acceptance code) is sent from the external device 1002, image data corresponding to the read command is read from the image memory 1019, and transferred in the designated format to the external device 1002, and the terminal of the end user (WWW browser).

Note that the image read command starts with alphabet "G", then continues with the acceptance code, and ends with the extension indicating the image format.

The acceptance code is returned to the external device 1002 upon reservation. For example, if "12543" is returned as an acceptance code, to read the image obtained by programmed image sensing, the following description is used:

<img src="http://cam.www.co.jp/G12543.gif">

Various information is stored into the storage device of the reservation register 1014 in the format of a table, e.g. as shown in FIG. 3. Note that in the present embodiment, the reservation register 1014 uses its own storage device, however, the reservation register 1014 may use the image memory 1019 of the camera control apparatus 1001 or any other storage device.

Note that the character string ("gif" in this case) meaning image formation, added to the end of the image read command must be basically the same as that of the reservation command. If different character string is used in the read command, however, it may be arranged such that the camera control apparatus 1001 converts the image stored in the image memory with the reservation code into a newly designated format data and transfers the converted data.

Returning to FIG. 3, in the above reservation, the acceptance code is "12543". That is, in FIG. 3, the reservation data indicates, first, image-sensing time, the acceptance code, image-sensing condition, and an image format.

The image memory 1019 is managed in the format as shown in FIG. 4, where an acceptance code (issued in correspondence with a reservation command, having a meaning equivalent to a file name), an image format, and actual image data are stored. Note that the image memory 1019 may be a storage device of any format, preferably having a sufficient capacity; for example, the image memory 1019 may be a hard disk device, a magneto-optical disk device and the like.

Next, the process procedure of the camera control apparatus of the present embodiment when it has received an image read command will be described.

In the command interpretation at step S101, if the head of the command is "G", the process proceeds to step S104, at which it is determined whether or not the command is a reservation command. Since the command is not a reservation command (NO at step S104) in this case, the process proceeds to step S108. As it is determined at step S108 that the command is an image read command, the process proceeds to step S109, at which corresponding data stored in the image memory 1019 is searched based on the acceptance code included in the image read command.

Then, at step S110, it is determined whether or not the data obtained by the above search has the same value of the acceptance code described as the image read command. If YES, the image data is read, and transferred via the communication interface unit 1011 to the external 1002 requesting the image data.

Also at this time, as the communication interface unit 1011 uses the HTTP protocol, content-type information and status information corresponding to the image format are added to the head of the image data (step S111).

At step S112, data in the storage area of the image memory 1019, from which the image data has been read out, is deleted. Then the process ends.

If it is determined at step S110 that image data corresponding to the designated acceptance code is not stored, as the programmed image sensing has not been performed and corresponding image has not been obtained otherwise the image data has been already transferred and deleted from the image memory, error information is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

Figure 12:
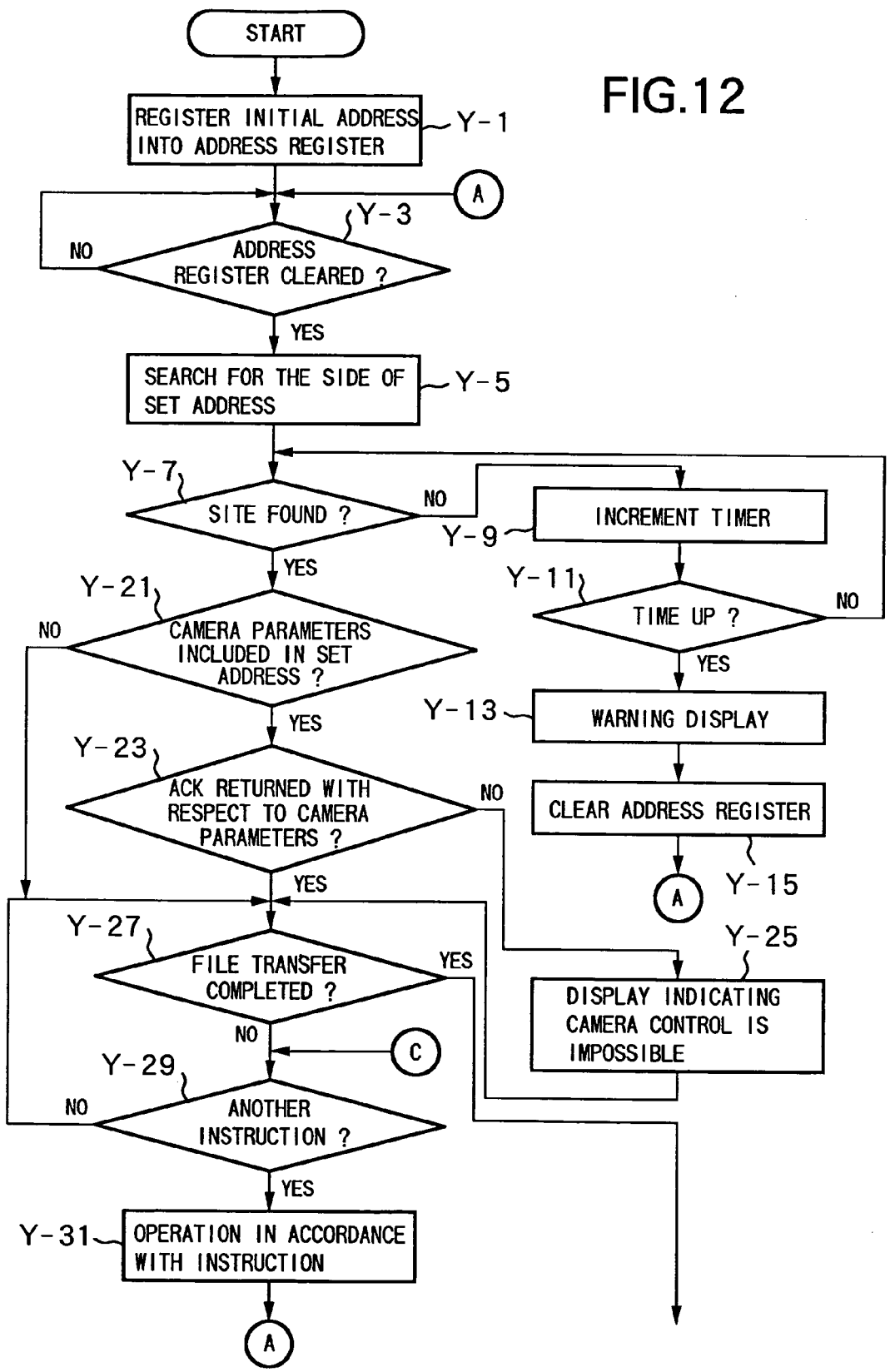
FIG. 12 is a flowchart showing a control process procedure on the client side according to the first to sixth embodiments.
Figure 13:
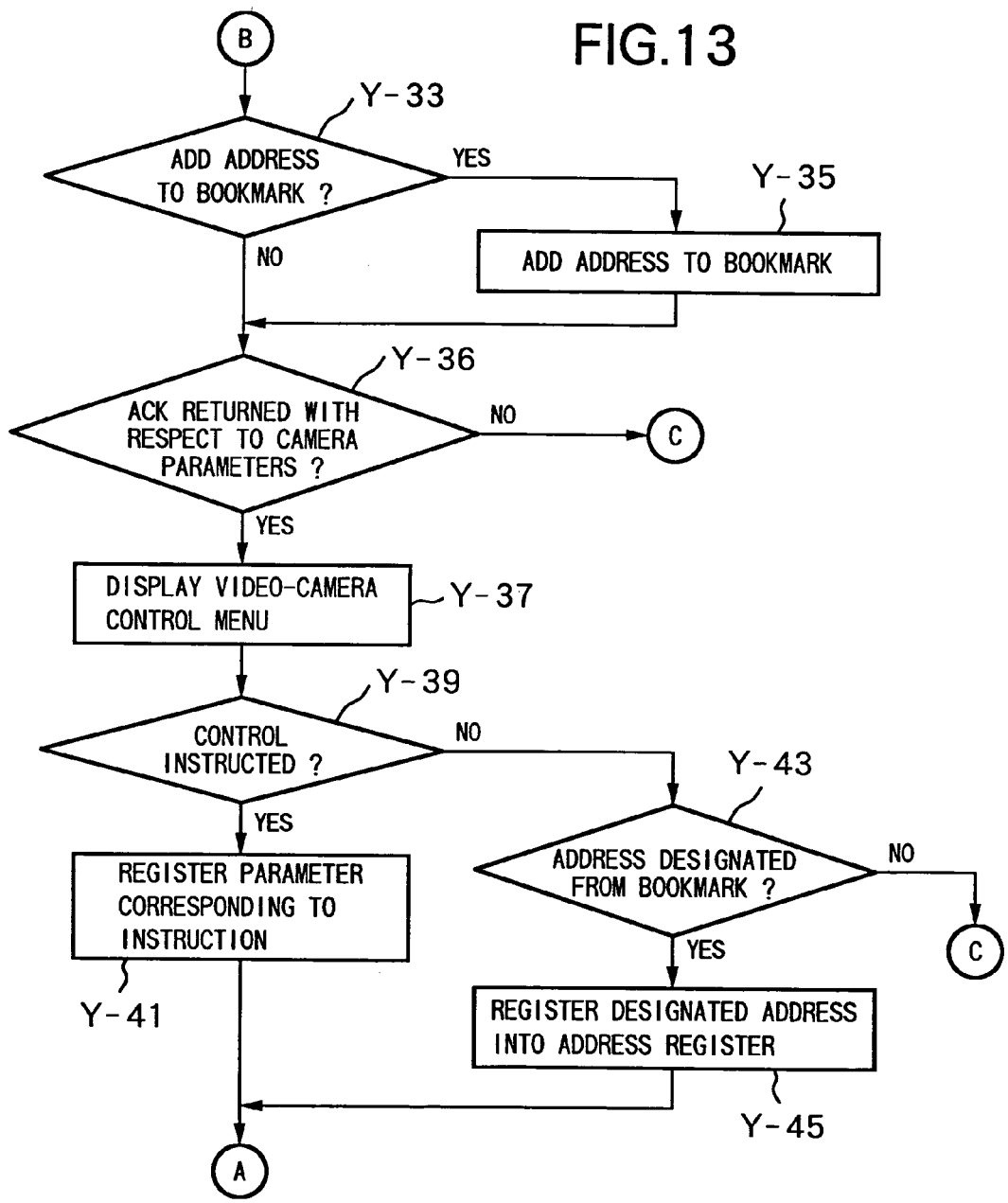
FIG. 13 is a flowchart showing a control process procedure on the client side according to the first to sixth embodiments.

Next, the operation of the client side of the present embodiment will be described with reference to FIGS. 12 and 13.

Step Y-1: an initial address (URL) is registered into the address register 4002 managed by the WWW browser 4001. The initial address may be an address designated by the user, or may be an address pre-set by a provider of the browser.

Step Y-3: it is determined whether or not the address register 4002 is cleared. If YES, the process enters stand-by status since there is no designated address.

Step Y-5: search of the site of the address set at the address register 4002 is started.

Step Y-7: it is determined whether or not the site of the designated address has been found. If YES, the process proceeds to step Y-21, while if NO, proceeds to step Y-9.

Step Y-9: Even if the site of the designated address is not found, time measurement is performed by the timer 4006.

Step Y-11: it is determined whether or not a predetermined period has elapsed from the start of the time measurement. If YES, the process proceeds to step Y-13.

Step Y-13: a warning display indicating that the site has not been found is made on the monitor display 4200.

Step Y-15: the address register 4002 is cleared, and the process returns to step Y-3.

Step Y-21: If the site of the designated address is found, i.e., the browser has been connected with the site, it is determined whether or not the address includes an image sensing command and camera control parameters, based on whether or not the command has the alphabet "P", as described at the above step S101 in FIG. 2. If NO, the process proceeds to step Y-27.

Step Y-23: if there are camera control parameters, it is determined whether or not the site of the set address has returned an acknowledgment (ACK) with respect to the control parameters.

Figure 2:
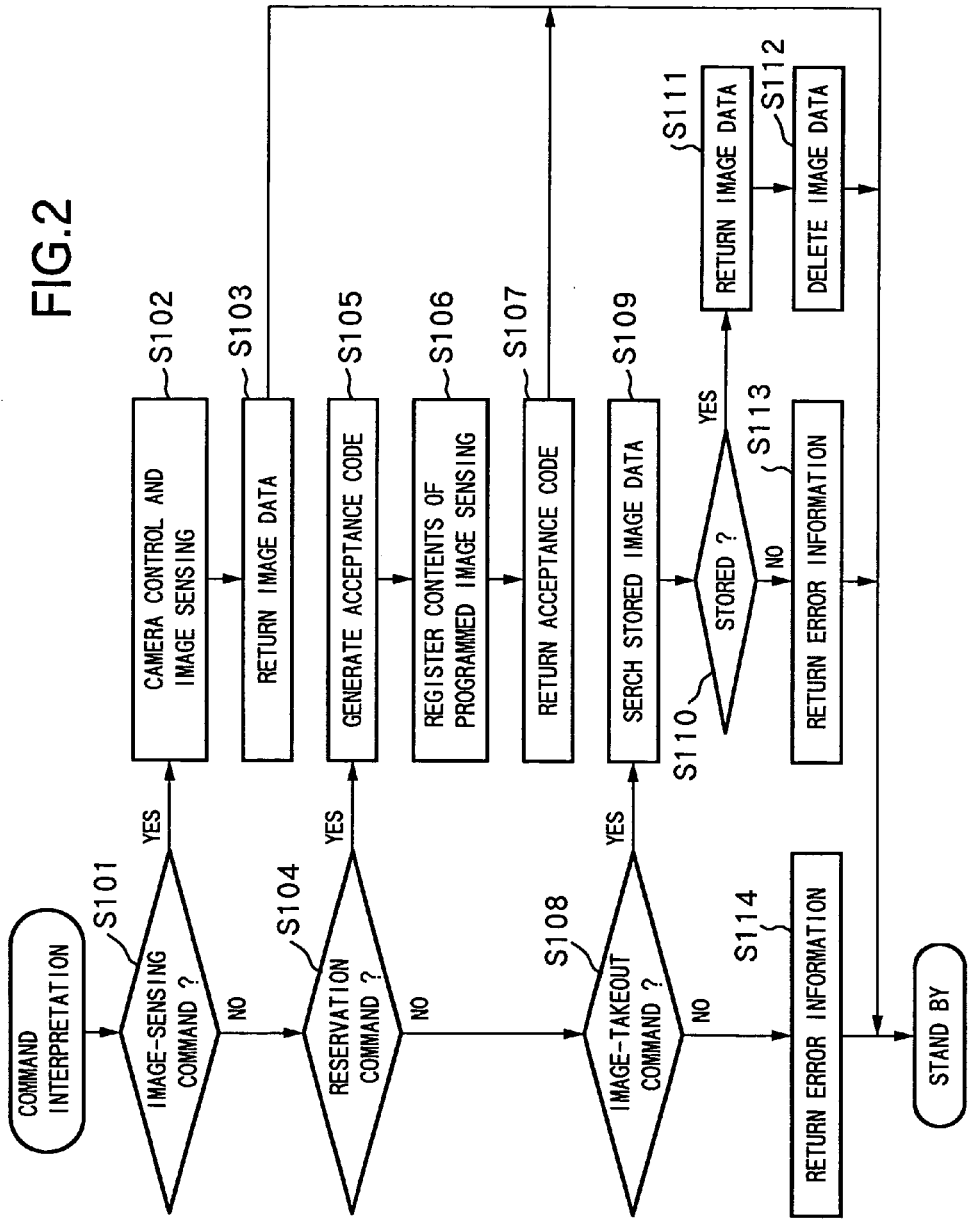
FIG. 2 is a flowchart showing an operation process procedure of a command interpreter according to the first embodiment.

Note that if the camera control based on the control parameters is possible at the site of the set address, i.e., if the camera server side can control the camera in accordance with the control parameters, the acknowledgment is returned as described at step S101 in FIG. 2.

Step Y-25: if no acknowledgment has been returned, or a signal indicating that the camera cannot be controlled in accordance with the control parameters has been returned from the camera server, display indicating that the camera control is impossible is made on the display 4200.

Step Y-27: it is determined whether or not image data has already been transferred as a file (or the transfer has been completed).

Step Y-29: If NO at step Y-27, i.e., the file transfer has not been completed, it is determined whether or not the user has made another instruction, e.g., the user has designated an address of another site.

Step Y-31: If YES, operation in accordance with the instruction is performed.

Step Y-33: it is determined whether or not the user has instructed to register the address in the bookmark.

Figure 14A:
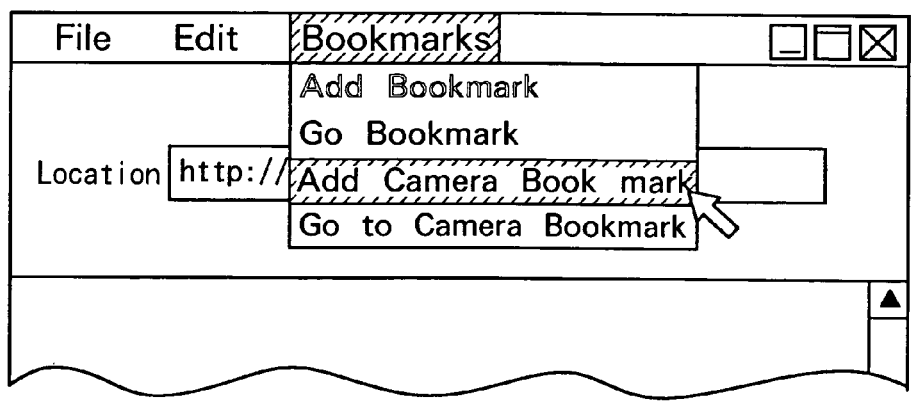
FIGS. 14A and 14B are examples of an operation display screen image for registration of camera bookmark according to the first to sixth embodiments.

FIG. 14A shows an example of the browser window on the monitor display 4200 when such instruction has been made.

Figure 14B:
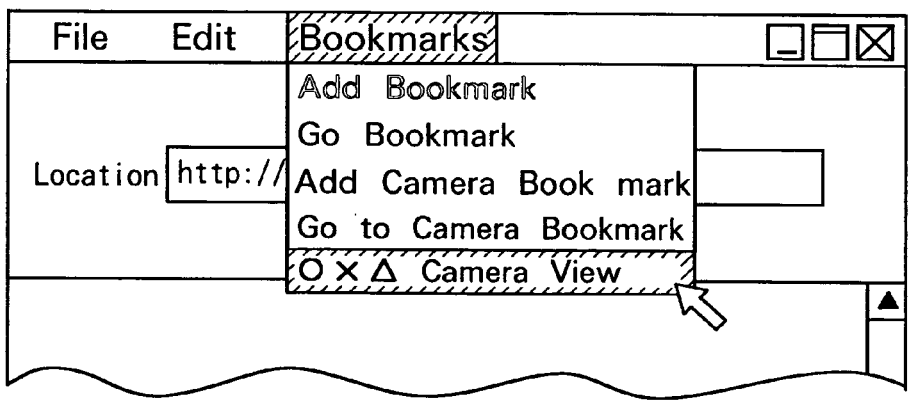

Step Y-35: as shown in FIGS. 14A and 14B, the address is registered in the bookmark in accordance with the instruction. Since the site connected to the browser is the camera server, the ordinary bookmark is unselectably displayed, while a camera bookmark is selectably displayed.

Step Y-36: it is determined whether or not an acknowledgment with respect to camera parameters has been returned. If NO, the process returns to step Y-29.

Figure 15:
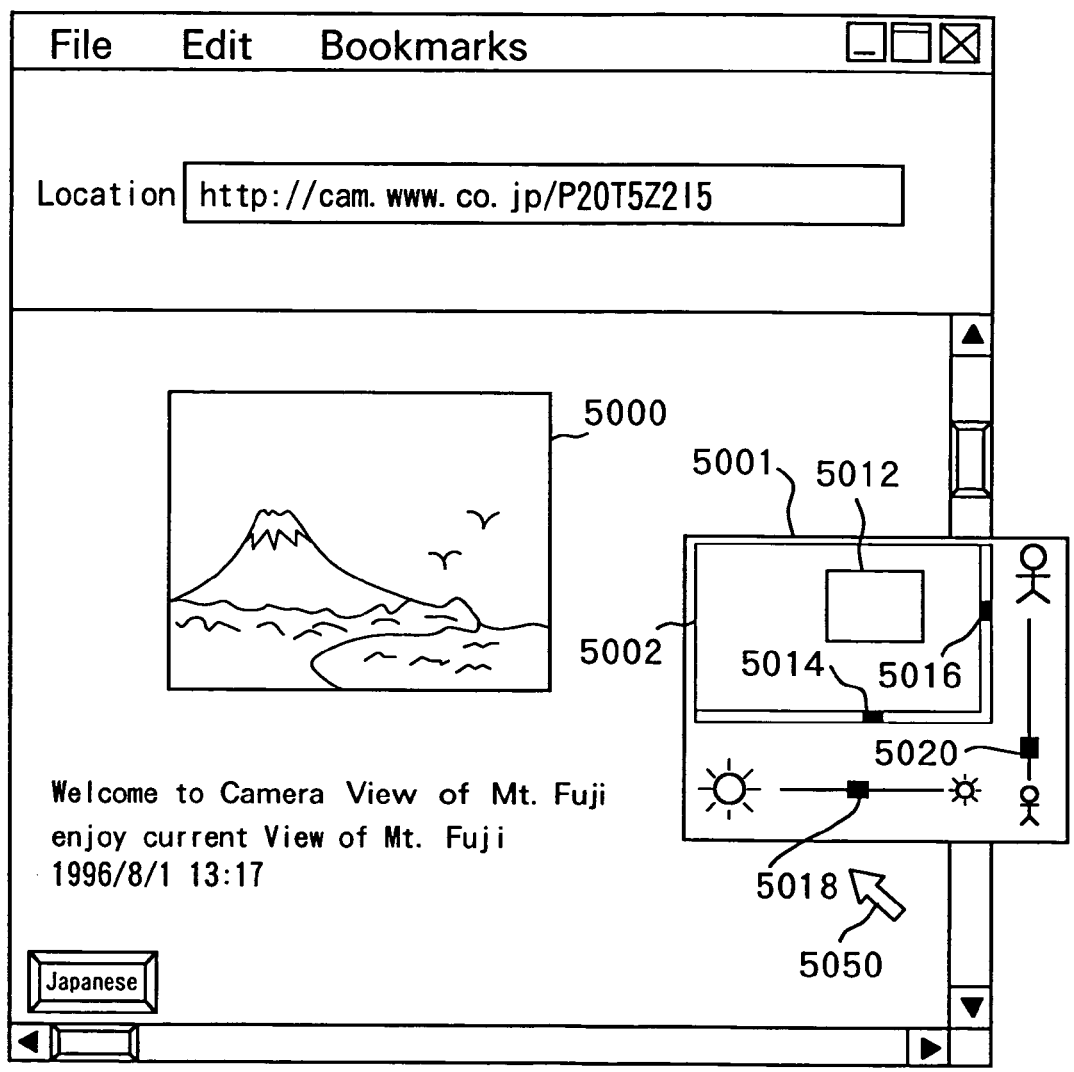
FIGS. 15 and 16 are respectively examples of a browser and its control window according to the first to sixth embodiments.

Step Y-37: if YES at step Y-36, as the browser is connected to a server which can perform camera control. Accordingly, a video-camera control menu is displayed as shown in FIG. 15.

That is, a character string for file transfer, comprising the address of the currently selected site (in FIG. 14B, ○×ΔCamera View) and a camera-control character string, is registered in the camera bookmark.

Step Y-39: it is determined whether or not control instruction has been made by the user.

Step Y-41: if YES at step Y-39, parameter(s) corresponding to the instruction is registered into the address register, and the process returns to step Y-3.

Step Y-43: If YES, it is determined whether or not an address has been designated from the bookmark by the user.

Step Y-45: if YES at step Y-43, the designated address is registered into the address register.

As described above, according to the present embodiment, if the address of a desired site is registered in the camera bookmark, and there is image input means such as a video camera for the site, information on control of the image input means is also stored. If control information such as a view angle, a zooming ratio and a shutter speed of the video camera, in accordance with the user's preference, is registered on the browser side, the camera status of the video camera can be automatically set via the Internet by accessing the site. This improves operability of the video camera.

Further, as the camera controller 111 receives a camera control instruction from the still-image delivery unit 103 and a control instruction from the moving-image helper/Plug-in 125 and changes control of the video camera 113, the video camera 113 can be used for both moving-image transfer and still-image transfer.

FIG. 15 shows an example of a camera control menu 5001 as displayed at step Y-37. The camera control menu 5001 is displayed when detecting an acknowledgment, indicating that camera control is possible, from the camera server as the object site.

In this example, the address of the site being accessed is:

http://cam.www.co.jp/P20T5Z2I5

In FIG. 15, numeral 5000 denotes an image obtained by the camera. The camera control menu 5001 is superimpose-displayed over the window of the site while it is displayed as an active window.

Numeral 5002 denotes an image-sensing range of the connected camera; 5012, inside of the image-sensing range 5002, a window displaying camera information using an image generated by the browser; 5014 and 5016, slides respectively for setting panning and tilting. The user can set the camera status by moving the slides 5014 and 5016 with a mouse 5050. In accordance with these settings, the camera control parameters are set to be transferred to the site side at the above-described step Y-41.

Numeral 5018 denotes a slide for controlling brightness of the video camera (iris); 5020, a slide for controlling the zooming ratio of the video camera.

Note that a parameter for iris control is represented by a numerical value following alphabet "I" in the character string. For example, in FIG. 15, the parameter is set as "I5" in the location window.

Accordingly, when a more preferable angle is obtained, parameters to obtain the angle are registered in the bookmark as described above. Thus, live video images can be obtained at the same camera angle.

As described above, information exchange is performed between the external device 1002 and the controller 1001 of the present invention.

Next, the timer 1015, used for performing camera control and storing the result of image-sensing, based on reservation data registered in the reservation register 1014, will be described.

In the timer 1015, at intervals of a predetermined period, e.g., one minute, a timer program is activated. This program is realized by utilizing a timer of a computer or the like.

Figure 5:
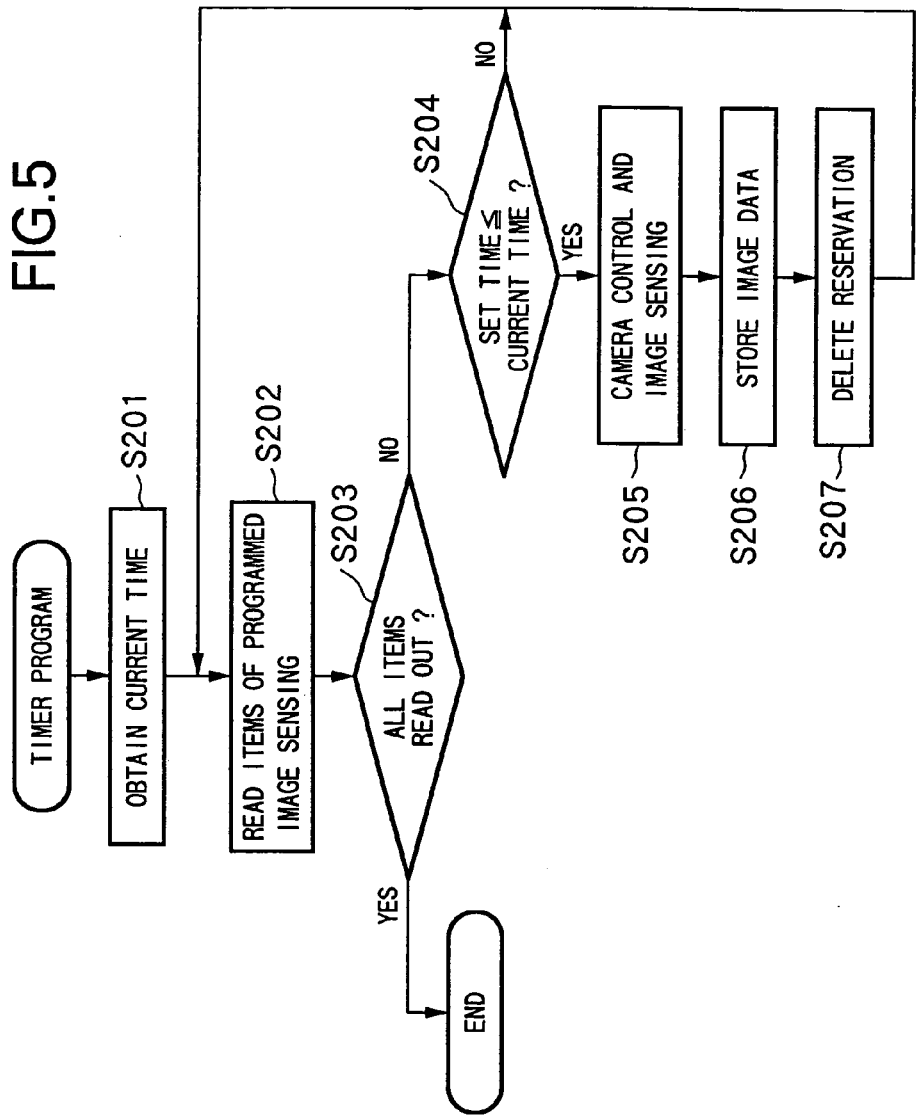
FIG. 5 is a flowchart showing an operation process procedure of a timer according to the first embodiment.

The operation of the timer program will be described with reference to the flowchart of FIG. 5.

First, at step S201, the current time is read from a timer of the camera control apparatus 1001, and the process proceeds to step S202.

At step S202, reserved contents, i.e., items of programmed image sensing sequentially registered in a respective row of the table of the storage device are read from the reservation register 1014. When it is determined at step S203 that all the items of programmed image sensing have been read out, the process ends, otherwise, the process proceeds to step S204, at which it is determined whether or not the designated time in the reserved data is in the future. If it is determined that the current time is not the designated time yet, the processing at step S202 and the subsequent steps is repeated.

On the other hand, if it is determined at step S204 that the current time is the designated time or past the designated time, the process proceeds to step S205, at which the camera 1003 is controlled to perform image sensing, by the camera controller 1017, in accordance with the image-sensing condition of the items of the programmed image sensing read from the reservation register 1014. Then, the obtained image is converted into image data of the image format designated by a corresponding item of the programmed image sensing. At step S206, the image data is stored, with an acceptance code and image format information, into the image memory 1019. As a result, the image data in the format as shown in FIG. 4 is attached.

Next, at step S207, the read items of programmed image sensing are deleted from the reservation register 1014, and the process returns to step S202 to repeat the processing.

As described above, image sensing is performed as programmed, and the result of the image sensing is stored, thereafter, when an image read command is sent from the external device 1002, the image data is returned in response to the command.

As described above, a live image obtained by controlling a remote camera can be easily pasted in a WWW document by connecting the camera control apparatus of the present embodiment to a network of the WWW system, and describing a URL where description of image-sensing condition is added to the address of the camera control apparatus, as the source of the image data. Note that if only pasting the image data in a WWW document is performed, the acceptance code generator 1013, the timer 1015, the image memory 1019 and the reservation register 1014 are unnecessary, and step S104 and the subsequent steps of the processing by the command interpreter 1012 are unnecessary.

Further, by providing the timer 1015, the image memory 1019 and the reservation register 1014, programmed image sensing can be reserved, and later the result of image sensing can be taken into a WWW page and the image can be displayed in the WWW page, by utilizing a CGI program of a WWW server or the like. Especially, if image sensing is tried by controlling a remote camera when the network is overcrowded, image transfer takes much time and cannot smoothly provides image data. However, according to the present embodiment, image sensing in such time is programmed with specific camera angle for a necessary period, and the programmed image sensing is reserved, thereafter, stored image data can be read when the network becomes less crowded, e.g., at midnight.

Especially, image sensing can be performed plural times with the same camera angle at short intervals regardless of the transmission capacity of the network.

Note that the HTTP protocol is used as the interface between the camera control apparatus 1001 and the external device 1002, however, any other communication interface can be used.

Note that the acceptance code is used to identify sensed image data corresponding to the reservation of programmed image sensing, however, it may be arranged such that, instead of using the acceptance code generator, a unique request code is generated on the external device 1002 side (end user side) as a part of a reservation command, then the camera control apparatus 1001 identifies the image data by the correspondence between the request code and the external device 1002.

Further, it may be arranged such that upon notifying the above request code to the image-requesting side, a password is issued, and when the image data is read, the image data can be transferred to the image-requesting side by the reservation code with the password. This avoids at least the inconvenience that a third person sends an image transfer request with accidentally the same reservation code and the file is transferred to the third person then deleted.

Further, image-sensing time is designated in minute unit, however, it may be designated in second or millisecond unit.

In the present embodiment, to indicate the image format, the extension "gif" is employed. It may be arranged such that the image format indicated by the extension "gif" is arbitrarily changed for a JPEG format indicated by an extension "jpg".

Further, the file name is regarded as a command, however, a parameter description of a URL can be utilized.

For example, panning, tilting, zooming and image format are respectively set to "25°", "5°", "twice" and "gif", image sensing can be programmed by the following description:

<img src="http://cam.www.co.jp/cameraimage?P=20,T=5,Z=2,F=gif">

Further, a WWW server may be installed into the camera control apparatus of the present embodiment. In this case, for example, a name "camctl.exe" is given to the program of the command interpreter 1012 as a CGI program for the WWW server, and the image sensing can be programmed by the following description:

<img src="http://cam.www.co.jp/cgi-bin/camctl.exe?P=20,T=5,Z=2,F=gif">

Furthermore, in the present embodiment, once the image data obtained by programmed image sensing has been transferred, the image data (file) is deleted, however, the image data is not necessarily deleted at this time.

That is, it may be arranged such that the image data, obtained by programmed image sensing and stored as a file, is held for an appropriate period, and when the period has elapsed, the image data is deleted even if the image data has not been transferred. This allows a plurality of end users to obtain the same image.

Further, it may be arranged such that a password is issued to an end user according to circumstances, and the image data is transferred only when the password coincides with that of the image data.

<Modification>

In the above embodiment, a camera control character string is inserted in an address in the bookmark, and the address is registered in the address register. However, as the camera control character string is displayed at the address window (location window in FIG. 15) of the site to be accessed, such display may be annoying to the user of the camera.

Accordingly, it may be arranged such that only the address of the site is displayed, without the camera control character string, at the location window. For this control, it may be arranged such that the software module of the browser has a step of discriminating the bookmark and the camera bookmark as shown in FIGS. 14A and 14B, and when the camera bookmark is discriminated, the camera control character string is discriminated from alphabet "P", and the subsequent character string is not displayed.

Figure 16:
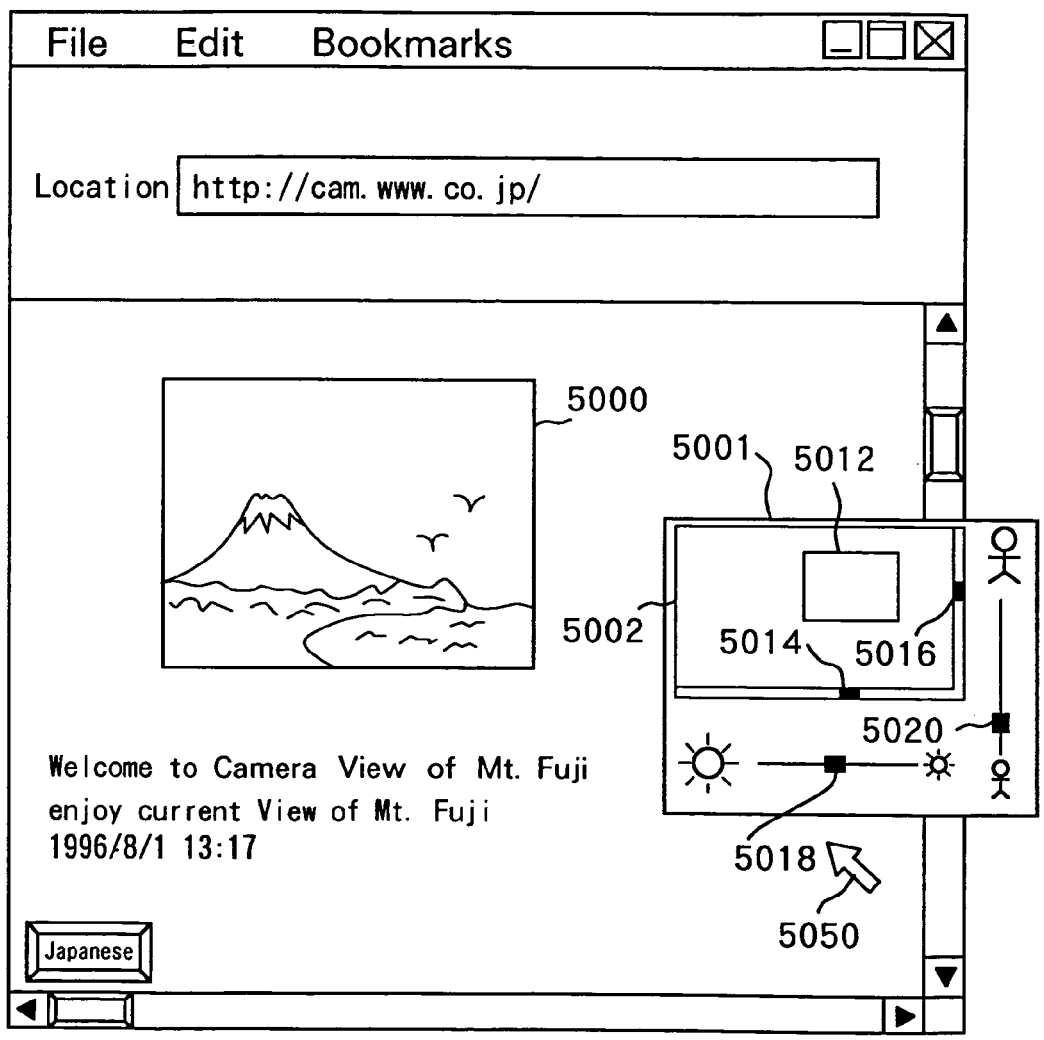

FIG. 16 shows a display example of the address designated at the camera bookmark, displayed in accordance with the above method.

This method simplifies the display of the address since the camera control character string is not displayed.

Further, in the present embodiment, the address of an object site and control information of the image input means are registered in the camera bookmark, however, the present invention is not limited to this arrangement. For example, only the address of an object site may be registered in the camera bookmark and the control information may be separately stored as another file.

That is, it is required only to store the address of an object site and control information of the image input means, in correspondence with each other.

Second Embodiment

In the above first embodiment, programmed image sensing can be reserved for only one image.

Next, a second embodiment will be described as an example where a plurality of reservation commands are combined with a sign "+" into a single file name, and a file extension indicating the image format is added to the file name, so as to reserve programmed image sensing with a plurality of image-sensing times and/or a plurality of camera angles.

For example, if image sensing is programmed with image-sensing times of 13:15, 13:30 and 13:45 on Jul. 6, 1997, a pan angle of 25°, a tilt angle of 0°, 3 times zoom ratio, with intention to read three images in "gif" format later, the reservation is described as follows:

<img src="http://cam.www.co.jp/R1996.7.6.13.15P25T0Z3+R1996.7.6.13.30P25T0Z3+R1996.7.6.13.45P25T0Z3.gif">

Note that if the image sensing is performed plural times at the same time or on the same date or at the same camera angle, the corresponding information in the character string may be omitted. For example, the above reservation command may be described as follows:

<img src="http://cam.www.co.jp/R1996.7.6.13.15P25T0Z3+R . . . 30+R . . . 45.gif">

Note in the above description, each period means omission of the same numerical value as the initially set numerical value (in this case, year, month, day, hour and minute). This reduces the amount of information by omitting corresponding information such as date.

The basic construction of the second embodiment is substantially the same as that of the first embodiment except the following changes.

That is, in the process procedure of the command interpreter 1012, steps S106, S111 and S112 are executed in accordance with the command including the above description indicated by "+".

In accordance with the command interpretation, image data are stored in accordance with acceptance codes "12543-1", "12543-2" and "12543-3", as shown in FIG. 17, from the acceptance code in the reservation table as shown in FIG. 3. Note that the acceptance code transferred to the WWW browser is only "12543". Thereafter, when an image read command is received, image data having the common part of the acceptance codes ("12543" in this case) are found. The image data are re-formatted in the order of the numerals after the hyphen of the common part of the acceptance codes, into a single image data indicating a plurality of images, and the image data is returned via the communication interface unit 101 to the external device 1002 requesting the image data. The above reformat of plural image data as a single image data is realized by, e.g., combining image data sequentially.

At this time, as the communication interface unit 1011 uses the HTTP protocol, content-type information and status information corresponding to the image format are added to the head of the image data.

At step S112 according to the second embodiment, the data in the storage areas in the image memory 1019, from which the plurality of image data have been read, are deleted.

The above construction enables to program image sensing, at a plurality of camera angles or image-sensing times at one time, and handles a plurality of image data obtained by the plurality of programmed image sensing as a single image data file comprising a plurality of images, thus unnecessitates management of a plurality of acceptance codes corresponding to the respective images.

Further, if this technique is applied to interval image sensing such as a record of a plant's growth, an image file containing a series of images can be handled as a pseudo moving image.

Note that in this case, the plurality of image data are not combined, but sequentially transferred.

It goes without saying that applications of the present embodiment is similar to the first embodiment.

Third Embodiment

In the above second embodiment, in case of image sensing at fixed intervals, reservation commands must be combined corresponding to the number of image sensings.

Next, a third embodiment will be described as an example where, in the reservation command, immediately after the designated time end time and interval time are added, and then image-sensing condition such as a camera angle and the image format are designated, to reduce the amount of information to be set. In this embodiment, the end time is designated by numerical values following alphabet "t", and the interval time is designated by numerical values following alphabet "e" in minute unit.

For example, in a case where image sensing is programmed with image-sensing time of 13:15 and 13:45 on Jul. 6, 1997, a pan angle of 25°, a tilt angle of 0° and 3 times zooming, with intention to read three images later, the reservation command is described as follows:

<img src="http://cam.www.co.jp/R1996.7.6.13.15t1996.7.6.13.45e15P25T0Z3.gif">

As described above, if the image-sensing date or time are the same, the description of these image-sensing date or time can be omitted. In such case, the reservation command is described as follows:

<img src="http://cam.www.co.jp/R1996.7.6.13.15t . . . 45e15P25T0Z3.gif">

The basic construction of the third embodiment is substantially the same as that of the first embodiment except the following changes.

That is, in the process procedure by the command interpreter 1012, steps S106, S111 and S112 are changed in accordance with the above reservation command. Further, step S207 in the timer program executed by the timer 1015 is changed in accordance with the above reservation command.

Further, in this case, the table format registered in the reservation register 1014 is as shown in FIG. 6.

That is, the end time and interval time of image sensing are added to the record in FIG. 3.

On the other hand, at step S106 in the command interpretation, if the reservation command has end time and interval time, the reservation is registered as programmed image sensing with the end time, the interval time, with the time of reservation as image-sensing time, and the image format, into the reservation register 1014 with the acceptance code.

Further, if the requested reservation command indicates simple reservation without end time and interval time, the image-sensing time is set as the end time, and the interval time is set to "1".

At step S111, a plurality of image data registered as "12543-1", "12543-2" . . . , having the same common part of acceptance code, similar to the second embodiment, are read, then re-formatted as a single image data including a plurality of image data, and returned via the communication interface unit 1011 to the external device 1002 requesting the image data.

At the time, as the communication interface unit 1011 uses the HTTP protocol, content-type information and status information corresponding to the image format is added to the head of the image data.

At step S112, data in the storage areas in the image memory 1019, from which the plurality of image data have been read, are deleted.

On the other hand, at step S207 in the timer program, the registered reservation information is updated with information obtained by adding the interval time in the read items of the programmed image sensing, and if the updated image-sensing time is behind the end time, the item of the image-sensing time is deleted from the reservation register 2014.

More specifically, the timer 1015 checks the contents of reservation at intervals of one minute. If the timer 1015 determines that the current time is the image-sensing time in FIG. 6, or the image-sensing time has passed (error is allowable within one minute), the image-sensing condition "P25T0Z3" is forwarded to the camera controller 1017 to perform image sensing. Then one of data as shown in FIG. 17 is stored in the image memory 1019. In FIG. 6, the interval time "15" is added to the image-sensing time "1996.7.6.13.15", thus the image-sensing time is updated to "1996.7.6.13.30", as preparation for the next image sensing. As a result, when the image-sensing time has passed the end time, the data in FIG. 6 is deleted.

The above construction enables to easily perform interval image sensing by a short reservation command.

Especially, when interval image sensing is performed for a long period, the second embodiment cannot substantially perform the image sensing due to the lengthiness of the reservation command. However, the third embodiment easily performs such image sensing if the memory capacity for storing image data is sufficient.

Fourth Embodiment

The third embodiment reads the result of interval image sensing as a plurality of still image data. Next, an example of reading the result of interval image sensing as moving image data will be described as a fourth embodiment.

Upon reading the result of interval image sensing as moving image data, the file extension is set to "mpg". For example, the reservation command is as follows:

<img src="http://cam.www.co.jp/R1996.7.6.13.15t . . . 45e15P25T0Z3.mpg">

Figure 7:
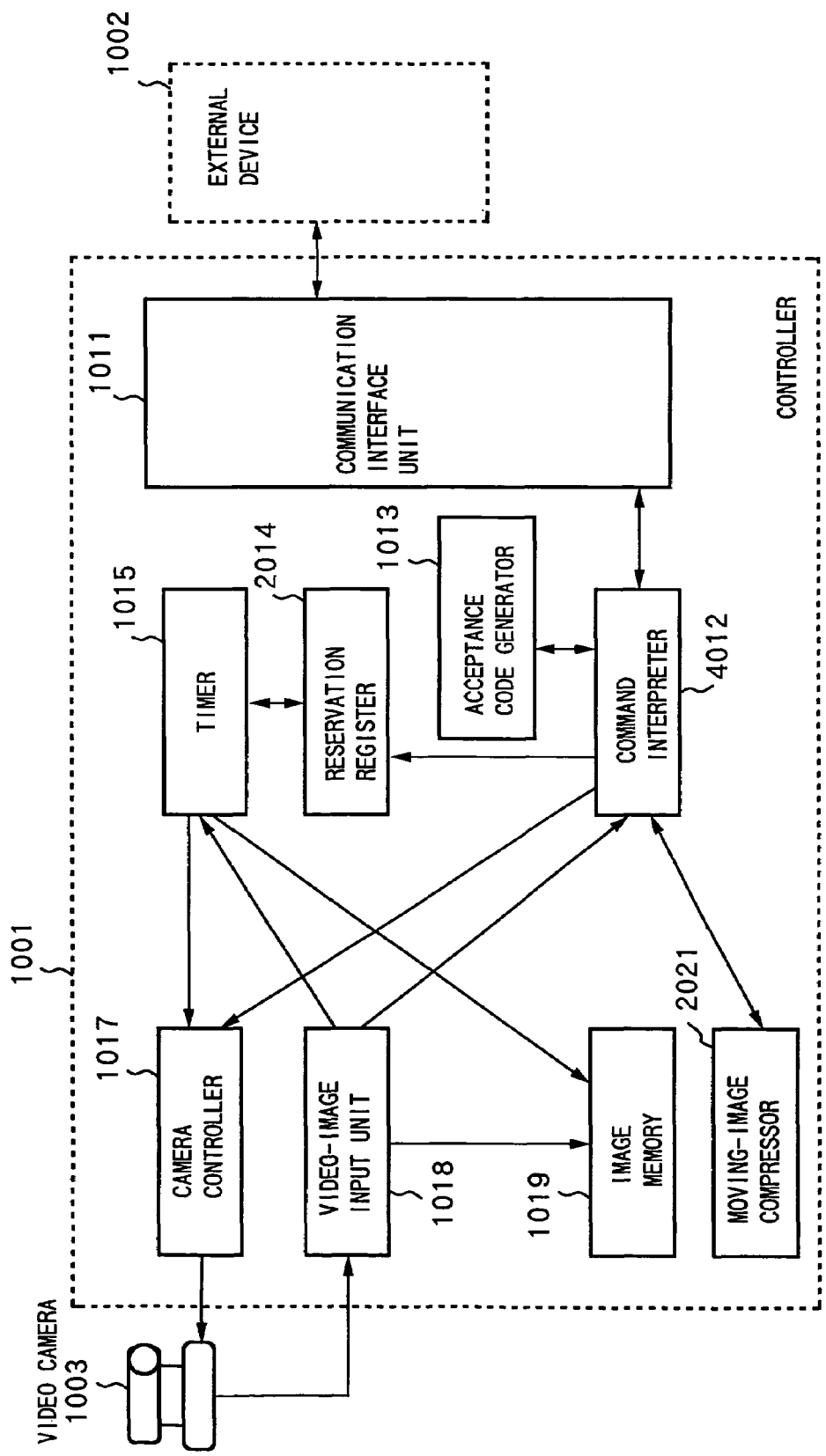
FIG. 7 is a block diagram showing the construction of the camera control apparatus according to a fourth embodiment of the present invention.

FIG. 7 shows the basic construction of the camera control apparatus according to the fourth embodiment. As shown in FIG. 7, the fourth embodiment has substantially the same construction as that of the first embodiment except the following changes.

That is, a moving-image compressor 2021 such as an MPEG1 compressing unit is added, and the command interpreter 4012 which interprets the file extension "mpg" is provided in place of a command interpreter 1012.

In this embodiment, at step S111 of the command interpretation process procedure, if the designated image format is a still image format such as "jpg" or "gif", a plurality of image data registered with the same reservation code are read, then, they are re-formatted into a single image data including a plurality of image data, and the image data is returned via the communication interface unit 1011 to the external device 1002 requesting the image data.

At step S111, if the designated image format is "mpg", a plurality of image data registered with the same reservation code are read, then the images are compressed by the moving-image compressor 2021, and the compressed moving image data are returned via the communication interface unit 1011 to the external device 1002 requesting the image data.

At this time, as the communication interface unit 1011 uses the HTTP protocol, content-type information and status information corresponding to the image format are added to the head of the image data.

The above construction compresses image data by using the relation between image frames, and especially in interval image sensing with slight change, compresses image data by a large data amount. This reduces the amount of communication when the image data are read, thus greatly shortens communication time.

Fifth Embodiment

In the third embodiment, the same camera angle is designated for interval image sensing. Next, a fifth embodiment will be described as an example where repetitive image sensing by adding a definition of a control variable immediately before the image-sensing time. In the reservation command, the image-sensing condition such as a camera angle and the image format are designated after the image-sensing time, similar to the above embodiments.

The definition of the control variable is described as "$(definition main body)" The definition main body is described by two ways of representation. One description is designating an initial value, an end value, and an increment. It is further divided into two descriptions depending on whether the increment is positive or negative. The other description is designating all the values of the control variable.

$(<control variable>=<initial value>,upto<endvalue>, up<increment>)

$(<control variable>=<initial value>,downto<endvalue>, down<increment>) or $(<control variable>=<value 1>,<value 2>,<value3>, <value4>, . . . <value n>)

Note that <control variable> is a character string, comprising at least one alphabet letter, as an identifier of the control variable.

The reference of the control variable is described as "$(reference main body)". The reference main body is operation using the four arithmetic rules (addition, subtraction, multiplication and division) including the control variable.

For example, if image sensing is programmed with image-sensing time of 13:15 on Jul. 6, 1996, and with
pan angle of 25°, tilt angle of 0°, and 3 times zooming,
pan angle of 30°, tilt angle of 0°, and 3 times zooming,
pan angle of 35°, tilt angle of 0°, and 3 times zooming, That is, to program "image sensing while changing the pan angle by 5°), with intention to read three images in "gif" format later, the reservation command is described as follows:

"http://cam.www.co.jp/R$(pan=25,upto35,up5) 1996.7.6.13.15P$ (pan)T0Z3.gif" or

"http://cam.www.co.jp/R$(pan=0,upto10,up5) 1996.7.6.13.15P$(pan+25)T0Z3.gif" or

"http://cam.www.co.jp/R$(pan=35,downto25,down5) 1996.7.6.13.15P$(pan)T0Z3.gif" or "http://cam.www.co.jp/R$(pan=25,30,35)1996.7.6.13.15P$ (pan)T0Z3.gif"

Note that it is impossible to perform image sensing to obtain a plurality of video images at the same time. Actually, image sensing is performed at intervals depending on the operation speed of the camera panhead.

Figure 8:
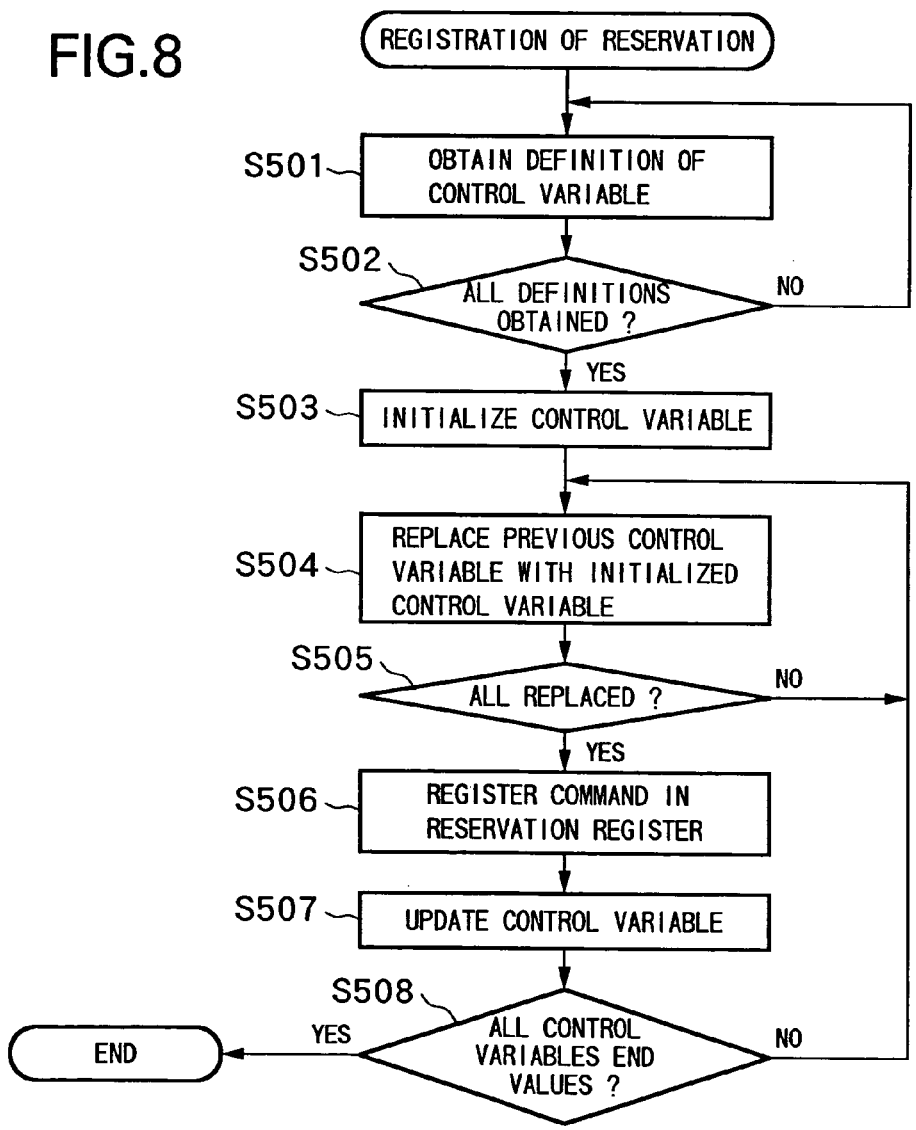
FIG. 8 is a flowchart showing a reservation registration process procedure according to a fifth embodiment of the present invention.

Although the basic construction of the fifth embodiment is the same as that of the second embodiment, step S106 in the processing procedure by the command interpretation 1012 is changed as shown in FIG. 8. Note that if the character subsequent to "R" is "$", as the definition of a control variable is described, the reservation command is described in accordance with the fifth embodiment.

First, at step S501, one control variable definition which starts with "$(" and ends with ")" is obtained, and at step S502, it is determined whether or not all the definitions have been obtained.

After all the definitions have been obtained, the control variable is initialized at step S503.

At step S504, the rest of the command is scanned to find a control variable reference which starts with "$(" and ends with ")", and previously initialized corresponding variable is replaced with the obtained control variable reference. When the replacement for the number of control variables has been completed, the process proceeds to step S506, at which the character string obtained by the above processing is interpreted as a reservation command for the above-described repetitive image sensing. Then the programmed image sensing is registered with the same reservation code generated at step S105 and image format, and with designated image-sensing times and image-sensing conditions designated by the respective reservation commands, as a plurality of reservations, into the reservation register 1014.

At step S507, the control variable at each repeated image sensing is updated to the next stage. Then the processing at step S504 and the subsequent steps is repeated until it is determined at step S508 that all the control variables have reached end values.

As a result, the reservation table as shown in FIG. 20 by interpreting the reservation command is produced. Note that as described above, although the respective image-sensing times are the same, it is impossible to perform image sensings at the same time. Actually, the image sensing is sequentially performed in the order of the numerals added to the common part of the acceptance code ("12543").

Thus, the above construction enables to easily perform interval image sensing while changing the camera angle by a short command.

Further, the present embodiment uses only one definition of control variable, however, a plurality of definitions can be described as nested definition.

In the fifth embodiment, repetitive construction is introduced; similarly, other constructions such condition-judgment, definition of variable, substitution of variable, operation using for arithmetic rules and the like, can be introduced.

That is, it may be arranged such that the command interpreter is realized as a program interpreter, to store the content of a URL as a program, and interpret and perform the program.

This enables to automatically perform even complicated camera control.

Sixth Embodiment

In the fifth embodiment, the camera angle of programmed image sensing must be designated in the same URL.

Then, a sixth embodiment will described as an example where a part of a reservation command is separately registered as a macro library.

In this embodiment, data describing image-sensing time and image-sensing condition (text file) stored in a secondary external device (arbitrary server on the network).

For the purpose of explanation, it is assumed that image sensing is programmed with image-sensing time of 13:00 on Jul. 6, 1996, while changing the camera angle by every minute as follows:

pan angle of 25°, tilt angle of 0°, 3 times zooming (Jul. 6, 1996 13:00)

pan angle of 30°, tilt angle of 0°, 3 times zooming (Jul. 6, 1996 13:01)

pan angle of 350, tilt angle of 0°, 3 times zooming (Jul. 6, 1996 13:02)

pan angle of 35°, tilt angle of 1°, 4 times zooming (Jul. 6, 1996 13:03)

pan angle of 35°, tilt angle of 2°, 4 times zooming (Jul. 6, 1996 13:04)

pan angle of 35°, tilt angle of 3°, 5 times zooming (Jul. 6, 1996 13:05)

pan angle of 35°, tilt angle of 4°, 5 times zooming (Jul. 6, 1996 13:06)

pan angle of 35°, tilt angle of 5°, 6 times zooming (Jul. 6, 1996 13:07)

pan angle of 35°, tilt angle of 5°, 7 times zooming (Jul. 6, 1996 13:08)

pan angle of 35°, tilt angle of 5°, 8 times zooming (Jul. 6, 1996 13:09)

A file containing commands designating the above image-sensing conditions and image-sensing times is stored into the secondary external device as:

http://www.bar.co.jp/camcon-a.ctl

That is, the address of the secondary external device is "www.bar.co.jp".

In this case, the content of the file is, for example, as follows:

R1996.7.6.13.0P25T0Z3+R1996.7.6.13.1P30T0Z3+
R1996.7.6.13.2P35T0Z3+R1996.7.6.13.3P35T1Z4+
R1996.7.6.13.4P35T2Z4+R1996.7.6.13.5P35T3Z5+
R1996.7.6.13.6P35T4Z5+R1996.7.6.13.7P35T5Z6+
R1996.7.6.13.8P35T5Z7+R1996.7.6.13.9P35T5Z8.gif The reservation command to be provided to the camera control apparatus starts with "%23(", then has the URL, and ends with ")". In/the above case, as it is necessary to inform the address of the command file, the reservation command is described as follows:

"http://cam.www.co.jp/%23(httpd %3A//www.bar.co.jp/camcon-a.ctl)"

Figure 9:
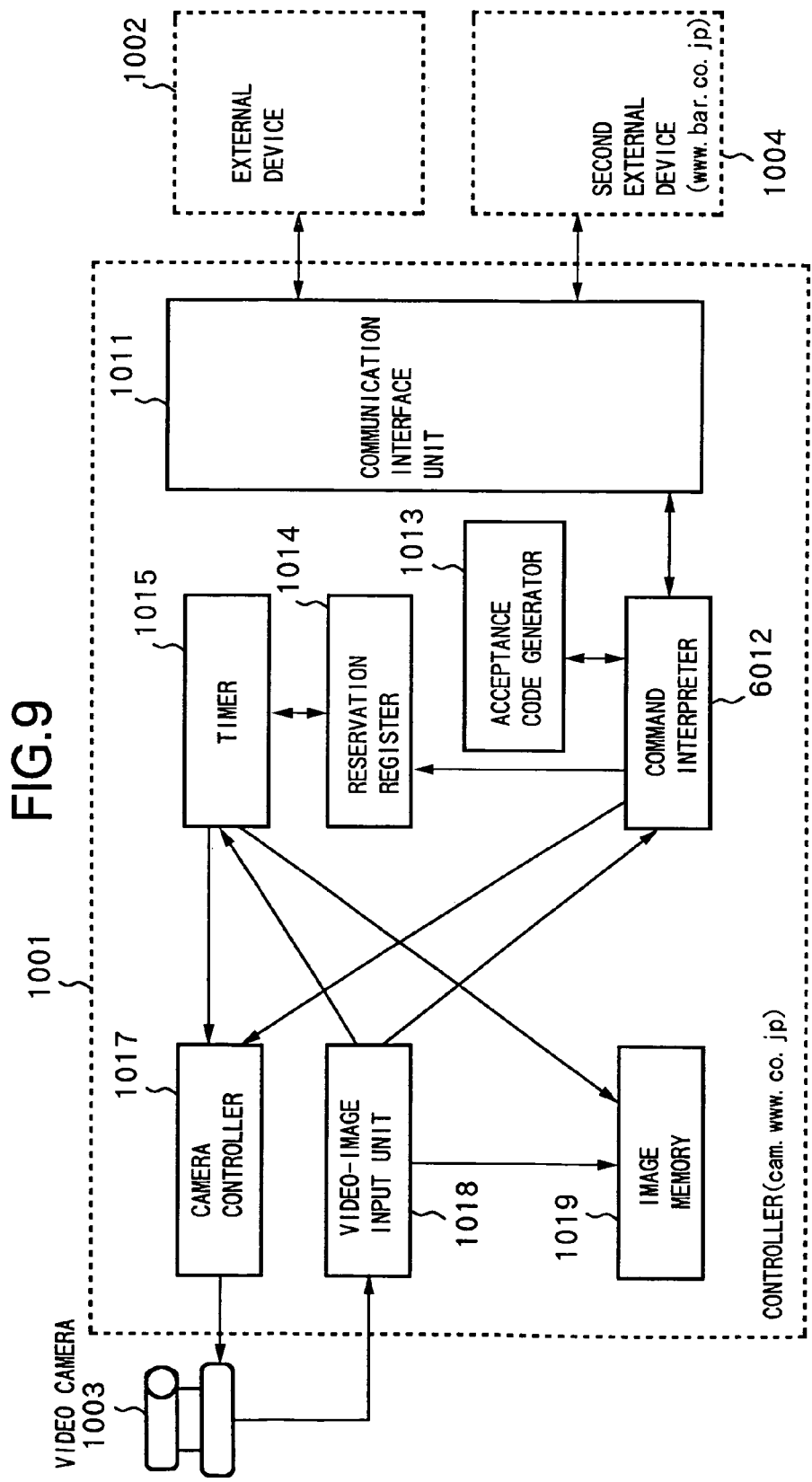
FIG. 9 is a block diagram showing the construction of the camera control apparatus according to a sixth embodiment of the present invention.

The basic construction of the sixth embodiment is as shown in FIG. 9. In comparison with the fifth embodiment, difference is that a command interpreter 6012 interprets the above reservation command and the camera control apparatus is connected to a secondary external device (a server in which the file including the command character string is stored) 1004.

Figure 10:
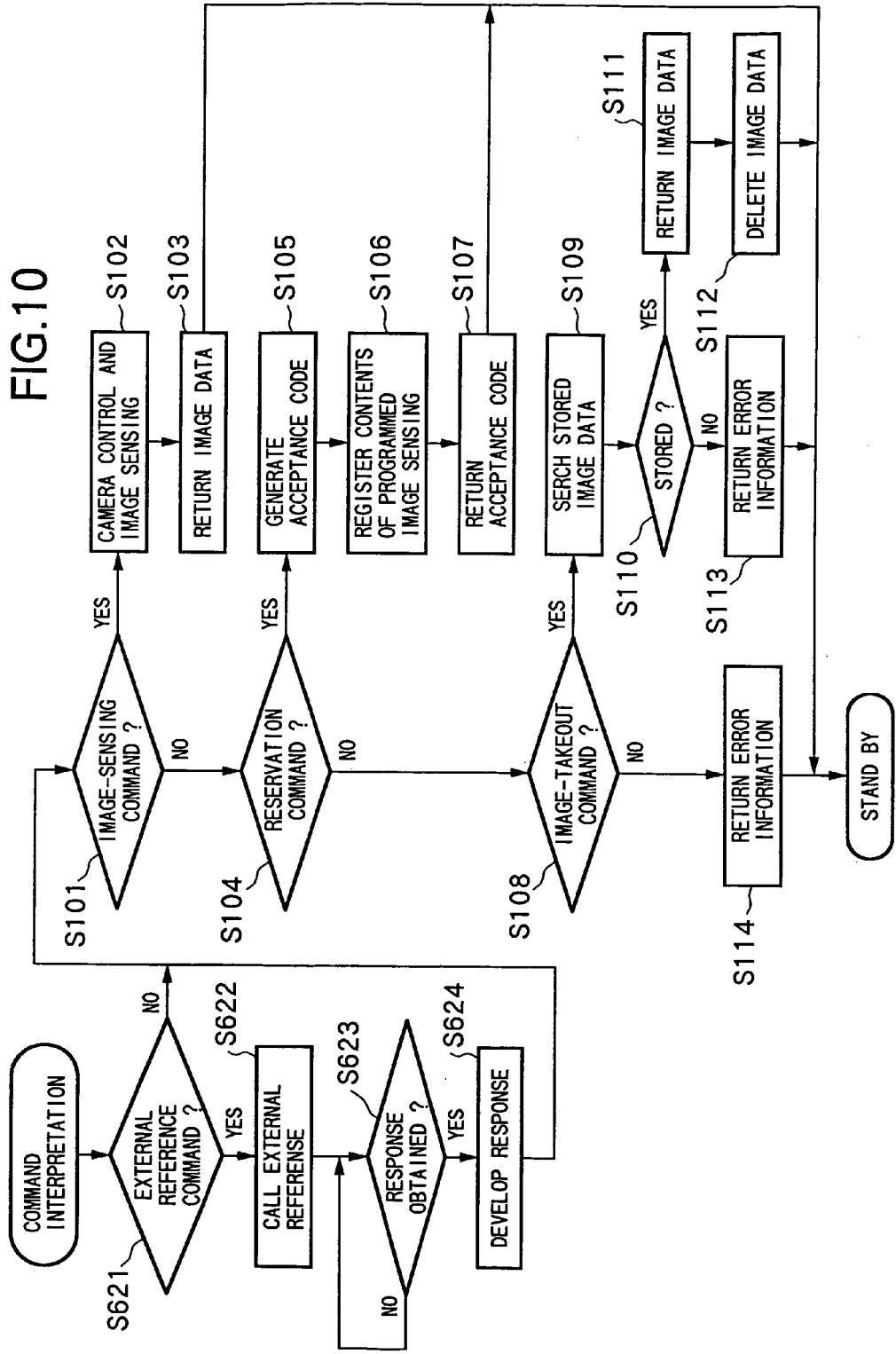
FIG. 10 is a flowchart showing a control-variable replacement process procedure according to the sixth embodiment.

Next, the operation of the command interpreter 6012 will be described with reference to the flowchart of FIG. 10.

At step S621, if the head of the command is "%23", it is recognized as an external reference command, then process proceeds to step S622.

At step S622, a bracketed description "( )" is regarded as a URL designating the stored file in which the command is described, and a file transfer request is issued in accordance with the URL. In the above case, as the file "camcon-a.ctl" is stored at "www.bar.co.jp", the file transfer request is sent to the secondary external device 1004 in FIG. 10.

At step S623, a response is awaited. As a result, a long reservation command as above is returned. The returned reservation command is developed by interpreting the external reference command and replacing it in the developed command, for use in the subsequent command interpretation (step S624). Then the process proceeds to step S101.

Note that at step S621, if the command is not an external reference command, the process also proceeds to step S101. The processing at step S101 and the subsequent steps is identical to that described in the first embodiment, therefore, explanation of those steps will be omitted.

Further, the processing at steps S621 to S624 can be applied to the second to fifth embodiments as well as the first embodiment.

The above construction enables to easily perform interval image sensing programmed with complicated changes of time and camera angle by a short command.

Especially, in accordance with the sixth embodiment, in a case where a plurality of camera control apparatuses (i.e., a plurality of cameras) are provided on the Internet, an image in the same image-sensing status can be obtained by the respective camera control apparatuses by using a file describing a reservation command of programmed image sensing which is stored into only one server.

For example, even when a plurality of camera control apparatuses are provided at various places in various countries, images can be obtained by their own respective image-sensing conditions, and further, an image can be obtained in accordance with image-sensing condition registered by a third person.

In the sixth embodiment, the camera control apparatus and the external apparatus holding the camera control file are described as separate apparatus, however, they may be integrated as a single apparatus. In this case, the URL is described as follows:

"http://cam.www.co.jp/%23(http %3A//www.foo.co.jp/camcon-a.ctl)"

Otherwise, in case of the same URL:

"http://cam.www.co.jp/%23(camcon-a.ctl)"

If the command is stored in the external device to which an image transfer request is issued, the address of the device can be used. In such case, the secondary external device is unnecessary.

Further, although not especially described in the present embodiment, if a plurality of camera-control right requests (i.e., request for right to the change camera angle and the like and transfer the obtained video image) have been issued by a plurality of end users at the same time, the camera control right is given to one of them. It is arranged, for example, such that the user whose request has been first stored in the queue of requests can obtain the camera control right. Otherwise, it may be arranged such that a specific user or the like can obtain the camera control right prior to other users.

However, the camera control right is not directly related with the present invention, therefore, further explanation of the camera control right will be omitted.

As described above, according to the first to sixth embodiments, it is possible to provide an end user with environment to easily remote-control a video camera via a general network such as the Internet.

Seventh Embodiment

In the above embodiments, the client side user has a problem that it is difficult to confirm whether or not camera control has been performed as requested.

When the camera angle is limited within a variable range, e.g., the pan angle ranges within ±50° from the center and the tilt angle ranges within ±20° from the center, if the client knows the angle variable range, there is no problem, however, it is difficult for all the users of many and unspecified number of clients on the Internet to know it.

It may be arranged such that, assuming that a client issues a request to change the pan angle to 70°, to avoid trouble upon receiving this request beyond the limitation of pan angle, the camera server returns an error signal. However, since the client desires to obtain an image, it is more preferable to return an image similar to the desired image as much as possible instead of returning the error signal.

That is, in this case, it is desirable that the pan angle is set to the maximum 50°, and the image obtained at the set camera angle is returned to the client.

In this operation, however, there is a possibility that the client misunderstands that an image sensed at the designated camera angle of 70° has been returned. Further, as the same image is returned when image sensing is requested at a pan angle of 50° and when image sensing is requested at a pan angle of 70°, the operation of the camera server may be doubted by the user.

These problems occur because it is not confirmed whether or not the camera control has been performed as requested, and because the status of the camera is not checked.

Similar problems occur in any system having a server machine which has a device control function and a client machine which can issue a control request to the server machine, other than the above camera control system.

If the communication protocol between the server machine and the client machine is unique to the system, any control information and its corresponding response information can be transmitted between these machines.

However, if a general protocol such as the HTTP protocol used in the above-described camera control system is used, information transmitted between the machines is more or less limited. That is, as the camera status cannot be returned in the above camera control system, sufficient response information cannot be returned in the communication in accordance with the general protocol.

Accordingly, a seventh embodiment will be described as an example where, on a general network, even if the content of a request from the client side exceeds the allowable control range of camera server, response is made with respect to the basic part of the request, and notification, indicating that the response does not fully meet the request, is sent to the client.

Next, the seventh embodiment will be described with reference to FIGS. 19 to 21.

Figure 19:
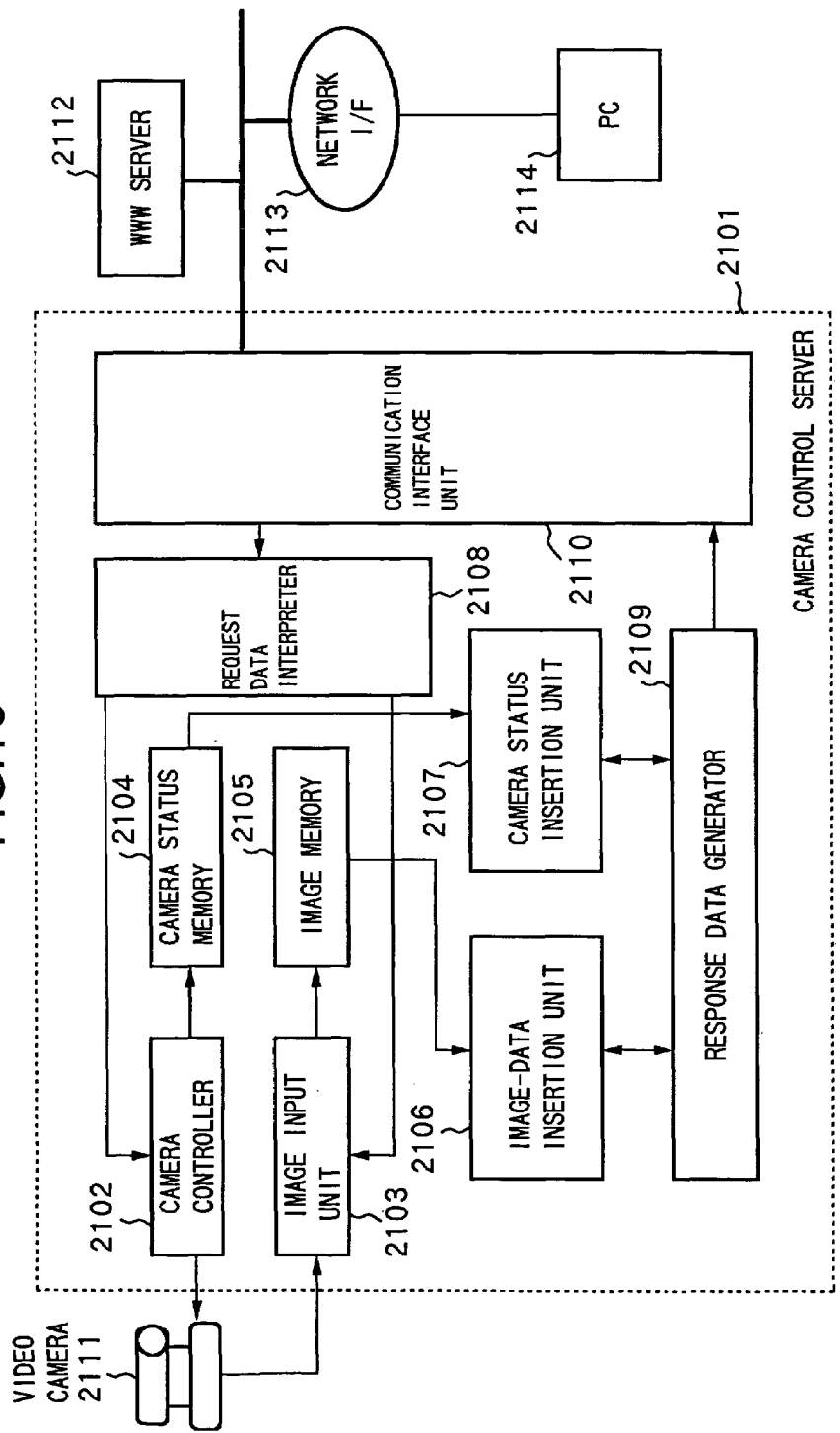
FIG. 19 is a block diagram showing the construction of a camera control system according to a seventh embodiment of the present invention.

FIG. 19 is a block diagram showing the construction of a camera control system according to the seventh embodiment of the present invention. In FIG. 19, numeral 2101 denotes a camera control server which controls a camera 2111, performs image capturing, and performs image communication with a client. The camera control server 2101 comprises the following devices. That is, within the dotted-line block of FIG. 19, numeral 2102 denotes a camera controller which directly controls the camera 2111 by using control lines via an interface such as an RS-232C cable; 2103, an image input unit which converts a video image data, inputted via a video-image communication cable from the camera 2111, into digital data, and inputs the digital data; 2104, a camera status memory for storing camera status information as the result of control of the camera 2111 by the camera controller 2102 and setting information such as camera movable range; 2105, an image memory for storing image data obtained from the image input unit 2103; 2106, an image-data insertion unit for inserting image data, stored in the image memory 2105, into the body of response data to the client; 2107, a camera-status insertion unit for inserting information, stored in the camera status memory 2104, into the header of the response data to the client; 2108, a request data interpreter which interprets request data from the client, and outputs a camera control command to the camera controller 2102 or a image-capture command to the image input unit 2103; 2109, a response data generator which completes the response data to the client, obtained from the image-data insertion unit 2106 and the camera-status insertion unit 2107; and 2110, a communication interface unit for communication with the client.

In the above construction, processes, other than the hardware elements, can be substantially realized with a CPU and a memory containing operation process procedures of the CPU. As it is well known, the programs for the operation process procedures are stored in a secondary storage device such as a hard disk. When the power of the device is turned on, an operating system is also read into a main memory (RAM) from the hard disk, and the program which operates as the camera control server 2101 is read into the main memory and executed.

Note that in FIG. 19, numeral 2112 denotes a WWW server which provides a WWW page including an image obtained from the camera control server 2101; 2113, a network such as the Internet or a LAN; and 2114, a personal computer (PC). The PC 2114 operates as a transfer destination of a video image from the camera control server 2101, i.e., a camera client. It can be understood that the communication protocol in the present embodiment is based on the TCP/IP (Transmission Control Protocol/Internet Protocol).

Next, the operation of the system as shown in FIG. 19 according to the seventh embodiment will be described below.

First, the operation when the camera control server 2101 is directly accessed from the WWW browser on the PC 2114 will be described with reference to FIGS. 20, 22 and 23.

FIG. 20 is a communication sequence chart showing connection operation and communication procedure between the WWW browser (a program which operates on the PC 2114) and the camera control server 2101. FIG. 22 is a flowchart showing an operation process procedure of the camera control server. FIG. 23 is a flowchart showing an operation process procedure of the WWW browser.

Assuming that now the PC 2114 has logged onto the Internet, activated the WWW browser, and inputted the following address designated as a URL:

"http://www.camera-server.foo.co.jp/
GetStillImage?p=20&t=10&z=3"

(Note that "camera-server.foo.co.jp" is an address of the camera control server 2101.)

The WWW browser interprets the input URL (step S2501). If the format of the URL is correct, accesses the designated host, i.e., the camera control server 2101 (steps S2502, timing 2101). This connection establishes a communication link between the WWW browser and the camera control server 2101, and messages and data can be transmitted mutually between the WWW browser and the camera control server 2101.

Next, the WWW browser sends a HTTP request to the camera control server 2101 (steps S2503, timing 2202). The content of the HTTP request is "GET/GetStillImage?p=20&t=10&z=3" (other data are sent as requests, however these data will not be described since they do not relate to the above operation).

The character string "GET" defines a method for processing the request, and its meaning is to request a resource indicated by the following URI (Uniform Resource Identifier). In this case, the URI is "GetStillImage?p=20&t=10&z=3".

First, the camera control server 2101 accepts connection request from the WWW browser (step S2401 in FIG. 22). This completes the connection and enables communication. Next, the camera control server 2101 receives the HTTP request by the communication interface unit 2110 (step S2402). The HTTP request is forwarded to the request data interpreter 2108.

The request data interpreter 2108 interprets the HTTP as request data (step S2403). That is, it is determined whether or not still-image transfer is requested, based on "whether or not the requested method is "GET" method" or "whether or not the URI includes a character string indicating a still-image transfer request" (step S2404). The request data interpreter 2108 has a table (ROM, hard disk or the like, both not shown), containing types and rules of various request commands, and determines, by using the table, that the character string "GetStillImage" requiring still-image transfer as a regular command.

If the above two conditions are not satisfied, data indicating error is returned as a HTTP response to the WWW browser (step S2414).

In this case, the two conditions are satisfied, the process proceeds to the next step.

Next, the request data interpreter 2108 determines whether or not the request data includes a camera control request (step S2405). If the character string "GetStillImage" is found in the URI, the data indicates still-image transfer, however, it cannot be determined that the data indicates camera control request. If the URI includes an encoded parameter in accordance with the rule of the camera control request, it can be determined that the data indicates a camera control request. That is, in this case, the character string "p=20&t=10&z=3" following the sign "?" are encoded parameters. "P=20" means a pan angle rightward 20°; "t=10", a tilt angle upward 10°; and "z=3", a thrice zooming. These parameters indicate request to control the camera 2111. If any of these parameters exists in the URI, it is determined that a camera control request is included.

As it is understood from the above description, the camera angle is defined such that the center of the pan angle is "0", the left to the center of the pan angle is "minus" and the right to the center of the pan angle if "plus"; similarly, the center of the tilt angle is "0", the below the center of the tilt angle is "minus" and the above the center of the tilt angle is "plus". The explanation of the zoom value will not be necessary.

It can be considered that a parameter other than camera control request parameters exists in the URI. For example, if an URI "/GetStillImage?v=640*480" is designated, the character string "v=640*480" means that the size of the still image to be captured is 640 dots (width)×480 dots (height). This parameter is used in the command to the image input unit 2103, however, it does not relates to camera control. That is, this parameter is used to set a format for transferring a video image later.

It can also be considered that a camera control request other than panning, tilting and zooming exists in the URI. For example, if the camera can be controlled regarding focusing, iris control, backlight correction and the like, further, if the camera can be moved on a rail, parameters for these controls are all included in the camera control request.

At step S2405, if it is determined that there is a camera control request, the interpreted parameter is translated into a command to the camera controller 2102 and forwarded to the camera controller 2102. The camera controller 2102 controls the camera 2111 in accordance with the command (step S2406).

The information on camera status as the result of control of the camera 2111 is stored into the camera status memory 2104 (step S2407). If the camera 2111 has been controlled as designated with the above pan angle, tilt angle and zooming ratio, data indicating panning=20°, titling=10° and zooming=thrice is stored. If there is any other camera control value of, e.g. the above-mentioned focusing, than these values, the camera status indicating the value is also stored.

Further, status information on a parameter other than designated parameter may be stored. For example, in the above example, only the values of panning, tilting and zooming are designated, however, any other undesignated control value such as focusing may be also stored at the same time. Thus, the status of the camera 2111 is always obtained by storing all the camera status information upon reception of a camera control request. When the camera 2111 is set to an autofocus mode, the focusing value varies when the panning, tilting or zooming value is changed, however, this causes no problem. These values are stored as current correct values.

In this case, it is arranged such that the camera 2111 and the camera controller 2102 are capable of bidirectional communication. When the camera controller 2102 controls the camera 2111, the camera controller 2102 inquires the camera 2111 of current camera status, it obtains the entire camera status, and stores the information into the camera status memory 2104.

Note that setting information of the camera 2111 is stored into the camera status memory 2104 as well as the camera status information. The camera status information is data indicating the hardware condition of the camera 2111, while the setting information is data set by the user.

For example, setting with respect to the camera movable range is one of the setting information. In a case where the camera 2111 can be panned within rightward 50° (+50°) to leftward 50° (−50°), there is a possibility that user of the camera control server 2101 does not allow the user of the PC 2114 to pan the camera within the maximum panning range, but limits the panning range of the camera to the user of the PC 2114. In this case, the camera control server 2101 can set a camera movable range (within actually mechanical movable range). Specifically, the camera control server sets the maximum panning value to the maximum rightward panning, and sets the minimum panning value to the maximum leftward panning. For example, if the user of the camera control server desires to set the panning range from rightward 30° to leftward 10°, the camera control server sets the maximum panning value to 30°, and the minimum panning value to −10°.

Further, if the user wants to limit the performance of the hardware of the camera 2111, various limitation information may be set. If the camera 2111 has a plurality of operation modes, one of the operation modes may be selected.

Any or all the setting information and the camera-status information are stored into the camera status memory 2104 (step S2407).

When the control of the camera 2111 has been completed, the image input unit 2103 performs image capturing (step S2408). Upon image capturing, a control parameter such as the above-described still-image size may be designated. In this case, the capturing is performed in accordance with the designated parameter.

The image input unit 2103 also performs compression on captured image data. The compression is not indispensable, however, since image data size is usually very large, it is effective to reduce communication time. As general WWW browser supports decompression and display of compressed image data, it is preferable to use the same compression method as that of the browser since the sent compressed image data is immediately displayed on the browser window.

The compressed image data is stored into the image memory 2105 (step S2409).

In the above procedure, all the data to be returned to the client have been prepared, then, a procedure to transmit response data is performed.

Next, the format of the response data will be described with reference to FIG. 21.

The format of the response data has a header and body, in accordance with the HTTP response format. The header is a text data comprising a plurality of lines. A carriage return (CR (=0dh)) code and a line feed (LF (=0ah)) code are added at the end of each line. Generally, these two codes are called, as one code, a "line feed code". In this format, only the CR/LF code is inserted as a partition of information. That is, a line having only the CR+LF codes functions as a partition.

In FIG. 21, the lines from the first line "HTTP/1.0 200 OK" (CR/LF code is omitted) to the fifth line "Content-length:5074" is a message defined by the HTTP format. These lines respectively indicate the response status, the data of the content of the body, the name of the HTTP server, the format of the content of the body and the length of the body.

The lines from the sixth line "Camera-location-pan-til-zoom:20,10,3" and the subsequent lines to the end of the header is status and setting information of the camera 2111, added by the camera control server 2101 by means of extending the header of the HTTP request.

Next, the respective lines will be described.

The sixth line "Camera-location-pan-til-zoom:20,10,3" indicates the current pan, tilt and zoom values, i.e., the camera position. In other words, this line indicates that the image to be transferred is obtained with a pan angle of 20°, a tilt angle of 10° and thrice zooming.

The seventh line "Camera-backlight:ON" indicates that backlight correction is ON.

The eighth line "Camera-focus:xxx" indicates that the focus value is "xxx".

The ninth line "Camera-iris:yyy" indicates that the iris value is "yyy".

The tenth line "Camera-Controllimit-pan-max:50" indicates that the maximum pan value within the camera movable range is 50°. That is, the maximum pan angle is +50° (rightward) and −50° (leftward) (indicated as minimum pan value in the eleventh line).

Similarly, the maximum tilt value is 20° (and −20° as the minimum value), the maximum zoom ratio is 8 times, and the minimum zoom ratio is one (the same size).

The body is binary data where captured image data (compressed image data) is directly inserted.

Next, returning to FIG. 22, description will be made with using the response data in FIG. 21. The response data generator 2109 first generates a response data header except the camera information (step S2410).

Next, the camera-status insertion unit 2107 inserts the camera status and the setting information into the response data header (step S2411). The camera status and the setting information inserted in the header are read from the camera status memory 2104.

Finally, the image-data insertion unit 2106 reads image data from the image memory 2105, and inserts the image data into the response body. Thus, the response data is completed (step S2412).

The completed response data is transmitted, as an HTTP response, from the communication interface unit 2110 to the WWW browser (PC 2114) (step S2413; timing 2203 in FIG. 20).

On the other hand, the WWW browser (PC 2114) receives the HTTP response (step S2504), and closes the connection with the camera control server 2101 (step S2505 in FIG. 23; timing 2204).

Next, the response data header is decompressed (step S2506). Normally, it is determined whether or not the status of the HTTP response is normal, and the format and the length of the body are recognized from "Content-type" and "content-length".

In case of a general WWW browser, the camera information in the response data header cannot be interpreted since this part is not included in the HTTP standards. However, the processing is not terminated as error even though the header includes uninterpretable information, but such information is ignored. In this case, as the camera information is not necessary (step S2507), it is skipped, and immediately the body is interpreted (step S2512). As the content of the body is a JPEG image from "Content-type", the image is expanded after the body is read, and the image is displayed on the browser window (step S2513).

If the WWW browser recognizes and utilizes the camera information (YES at step S2507), the process proceeds to step S2508 at which the camera information is interpreted.

If necessary, some of the camera information are displayed on the browser window (step S2509). The way of display depends on the WWW browser.

The WWW browser contains the URL inputted by the user, and can interprets the camera control request similarly to the request data interpreter 2108. The WWW browser compares the content of the camera control request, obtained from the interpretation, with the camera information included in the response data header, and if warning to the user is necessary (step S2510), displays a warning message (step S2511).

For example, if the user has designated a pan angle of 70°, it is impossible to pan the camera at that angle, therefore, the camera is panned at the maximum pan angle of 50°, and image data obtained at that camera position is transmitted. Since the image, which has been obtained at the camera angle different from the designated angle, is returned to the user, notification of the different camera angle should be made to the user. Further, at step S2509, the current pan angle may be displayed on the browser window.

However, it is difficult to attract the user's attention only by showing numerical values. Then, if the actual camera angle is different from the designated camera angle, a special warning message is displayed so that the user notices the change of the camera angle. The warning message is, e.g., "Pan angle exceeds the maximum designatable value. The current pan angle is 50°.". It may also be arranged such that an appropriate warning message is generated according to circumstances.

After the warning message has been displayed, or it is unnecessary to display the warning message since the camera control request coincides with the returned camera information, the process advances to step S2512 and the subsequent steps, and finally, an image is displayed.

As described, according to the present embodiment, when remote-controlling a camera, the user can obtain determination information to determine whether or not a video image transferred from the camera server has been obtained as designated, or the image is different from an image to be obtained due to error in designation of camera angle, by comparing designated content with actual status.

Further, as described above, when the actual maximum view is defined with a pan angle of ±50°, a tilt angle of ±20° and 1 (the same size) to 10 times zooming, while a camera angle for the WWW browser (PC 2114) is defined with a pan angle of −10° to +30°, a tilt angle of ±10° and 1 to 5 times zooming, the camera controller allows to change the camera angle within the allowable range. If a designated value exceeds the allowable range, the value is changed to a value closest to the designated value, within the range. The camera-status insertion unit 2107 inserts the information, where the designated value is forcibly changed as above, into the response data header.

The user of the WWW browser can operate the camera without a sense of incompatibility, since the user recognizes the angle of the camera of the connected camera control server as a pan angle of −10° to +30°, a tilt angle of ±10° and 1 to 5 times zooming, and the user cannot operate the camera with an angle without the allowable camera angle range (even if he/she can operate the camera with the angle without the camera angle range, error is notified).

Further, in the above description, the client, i.e., WWW browser program displays a message or the like when a designated value exceeds the allowable range, however, it may be arranged such that, on the camera control server side, a message character string notifying of an operation error is overlaid on a unused portion (e.g., a corner) of a captured video image data (digital data) before the video image data is compressed, then, the image data is compressed and transferred to the WWW browser. In this case, a font ROM or an image corresponding to the character string of the message is prepared in advance on the camera control server side. Further, a warning-message character string may be written into an HTTP message header so that the WWW browser side can compare the current pan angle with the pan angle required by the WWW browser, both written in the HTTP message header.

Eighth Embodiment

Next, an eighth embodiment will be described as an example where the WWW browser on the PC 2114 accesses the camera control server 2101 via the network 2113 and the WWW server 2112.

As the details will be understood from the following description, the eight embodiment removes procedure (add-in program) from steps S2507 to S2511 in FIG. 23 for a general WWW browser, similar to the seventh embodiment.

In this case, the WWW server 2112 has a WWW page in which a still image can be inserted. This page will be referred to as "still-image sample page". FIG. 27 shows the still-image sample page displayed on the WWW browser.

In FIG. 27, the window is divided into three windows. The first window includes a title text; a second window, a form constructed with boxes for inputting pan, tilt and zoom values and a key for issuing a camera control command, when being depressed after inputting these values; and a third window, an area where a still image is inserted and a text relating to camera information.

Figure 25:
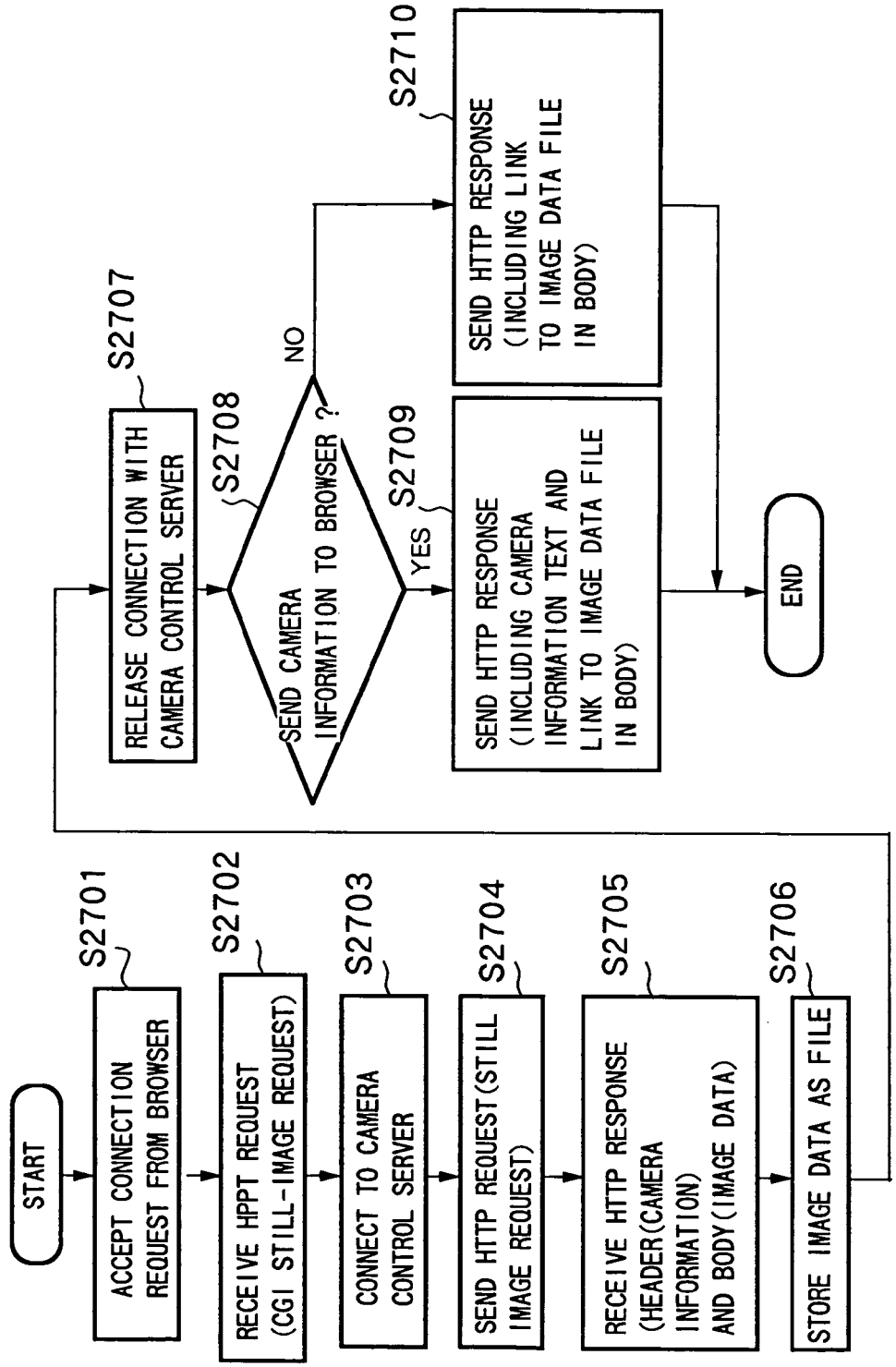
FIG. 25 is a flowchart showing the operation of the WWW server according to the eighth embodiment.
Figure 26:
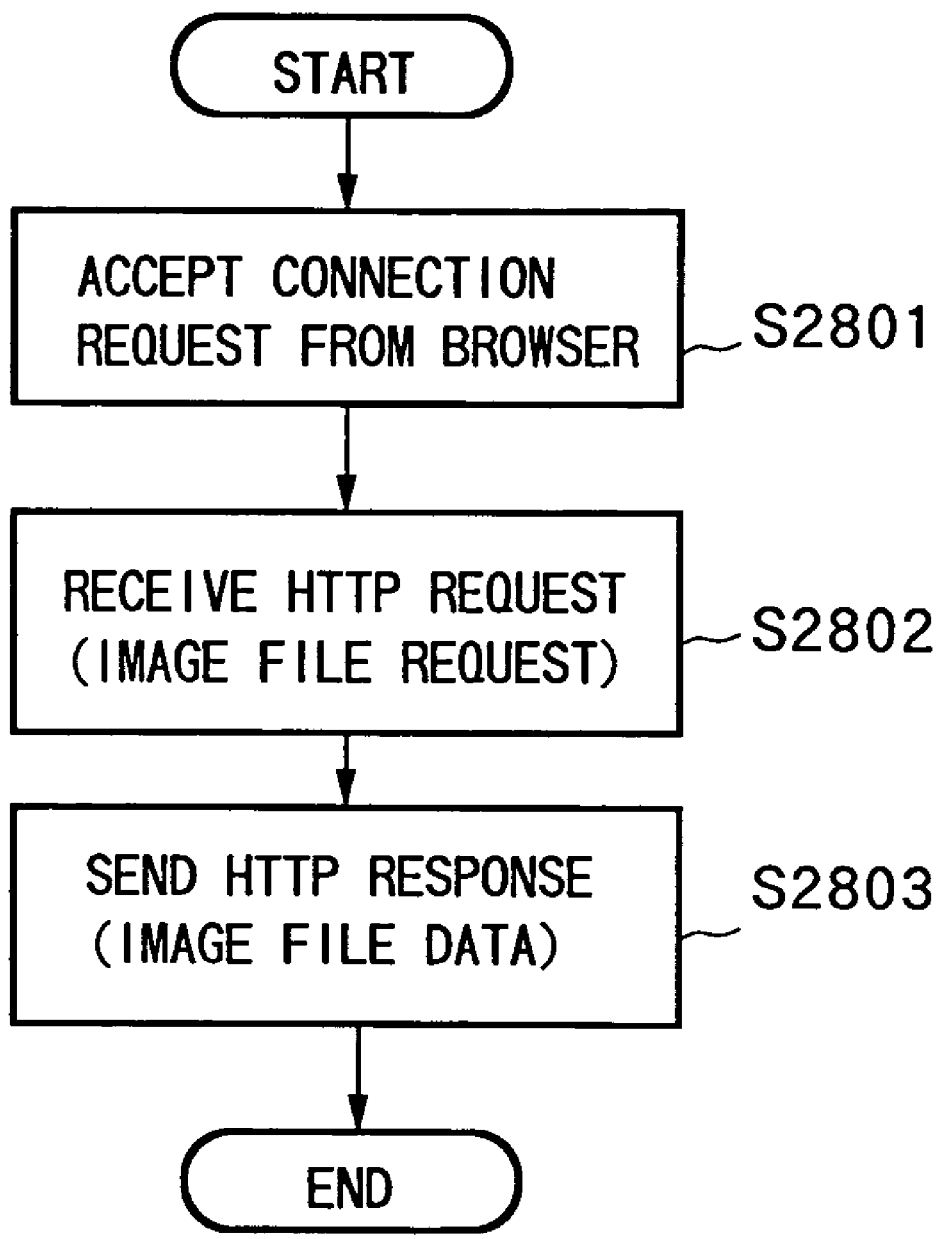
FIG. 26 is a flowchart showing the operation of the WWW browser according to the eighth embodiment.

Hereinbelow, the operation of the eighth embodiment will be described with reference to FIGS. 24 to 26.

Figure 24:
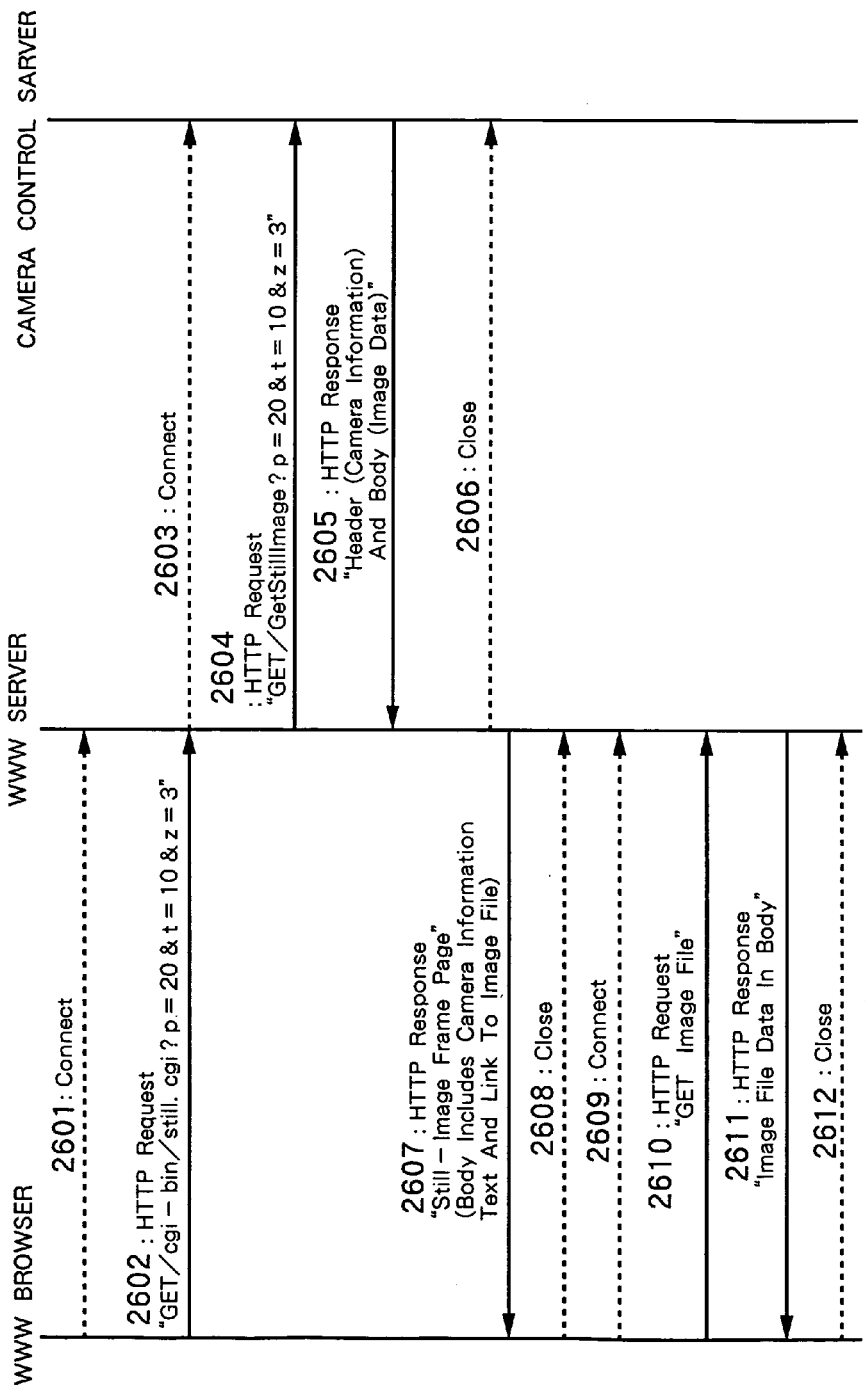
FIG. 24 is a communication procedure among the WWW browser, a WWW server and the camera control server according to an eighth embodiment of the present invention.

FIG. 24 shows connection operation among the WWW browser, the WWW server 2112 and the camera control server 2101 when transmitting the third window and the contents of the communication messages. FIGS. 25 and 26 are flowcharts showing the operation processing procedure of the WWW server 2112.

The operation of the camera control server 2101 at this time is the same as that shown in FIG. 22; and the operation of the WWW browser at this time is the same as that shown in FIG. 23.

First, the WWW browser accesses the still-image sample page of the WWW server 2112. The first frame and the second window are sent from the WWW server 2112 to the WWW browser in accordance with the HTTP protocol. Then, the third frame is accessed.

The second window is realized by using a CGI. The CGI is interface for the user of the WWW browser (user of the PC 2114) to perform interactive operation with respect to the WWW server. The CGI sends the result of input into the form by the user to the WWW server 2112.

In this case, the second window is formed by using the CGI, in which numerical values are inputted into the boxes of pan, tilt and zoom values, and a camera control key is depressed (clicked). Thus, the WWW server 112 is requested to transfer the third window.

That is, the WWW browser establishes connection with respect to the WWW server 2112 (timing 2601 in FIG. 24), and sends a HTTP request (timing 2602).

At this time, the URI indicates a CGI script or a program executed on the WWW server 2112 and parameters to be forwarded to the CGI script. That is, in this example, the CGI script to be executed is "/cgi-bin/still.cgi", and parameters to be forwarded to "/cgi-bin/still.cgi" are "p=20&t=10&z=3" after "?".

To send the HTTP request, the user only input numerical values into the boxes of the pan, tilt and zoom values and depresses (clicks) the camera control key.

The WWW browser encodes the contents of input form into a URI. That is, as the WWW browser performs encoding in accordance with the description in the second window, the user does not need to input all the URL as in the seventh embodiment.

The WWW server 2112 first accepts the connection request from the WWW browser (step S2701 in FIG. 25), then, receives the HTTP request sent from the WWW browser (step S2702). The WWW server 2112 finds that a CGI-script activation request is included in the request, then activates the CGI script and forwards the parameters to the CGI script. The subsequent operation is made by the CGI script.

The CGI script reads a still image and camera information from the camera control server 2101 which has been set as a connection destination in advance.

First, the CGI script establishes connection with the camera control server 2101 (step S2703, timing 2603), and sends a HTTP request, requiring a still image, to the camera control server 2101 (step S2704, timing 2604). The CGI script recognizes the URI "GetStillImage" to request the camera control server 2101 for a still image. The parameters to the CGI script are used as camera control parameters.

The camera control server 2101 receives the HTTP request, operates as shown in FIG. 22, i.e., sends an HTTP response including camera information in its header and image data in its body, to the WWW server 2112 (timing 2605).

The WWW server 2112 receives the HTTP response (step S2705), and temporarily stores the image data as a file (step S2706).

Then, the WWW server 2112 releases the connection with the camera control server 2101 (step S2707, timing 2606).

Next, the WWW server 2112 determines whether or not the obtained camera information should be sent to the WWW browser based on pre-set data (step S2708). If the camera information should be sent, the WWW server 2112 transmits a still-image frame page including camera information text and a link to the above image data file, as a third frame, in the body (step S2709, timing 2607). If the camera information should not be sent, the WWW server 2112 transmits a still-image frame page which does not include the camera information text but includes the link to the image data file, as a third frame, in the body (step S2710).

In the HTTP protocol, data having a plurality of "Content-type"s cannot be sent. For example, text and image data cannot be sent simultaneously. However, HTML is used for displaying these data as one page on the WWW browser.

Accordingly, in this case, the still-image frame page including the camera information text and the link to the image data file in the body is sent as a HTML document.

The WWW browser receives the HTML document, displays a text in accordance with the format of the HTML, and temporarily releases the connection with the WWW server 2112 (timing 2608).

The WWW browser finds the link to the image data file in the HTML document, accesses the WWW server 2112 again to read the image data file. That is, the WWW browser establishes connection with respect to the WWW server 2112 (timing 2609), and sends a HTTP request to read the image data file (timing 2610).

The WWW server 2112 accepts the connection request from the WWW browser (step S2801), and receives the HTTP request (step S2802). The WWW server 2112 recognizes the image data file designated in the URI, and sends the image file stored at step S2706 as an HTTP response (step S2803, timing 2611). As the camera information has been already sent, it is not necessary to insert the camera information in the header of the HTTP response.

Finally, the WWW browser receives the HTTP response, releases the connection with the WWW server 2112 (timing 2612), develops the image data, and displays the image data in an image display area designated by the still-image frame page.

The eighth embodiment which sends camera information and image data via the WWW server 2112 to the WWW browser is as described above.

In comparison with the seventh embodiment, the eighth embodiment has an advantage that WWW browser does not need to recognize and interpret camera information data in the head of response data, as in the seventh embodiment. The response data header does not include the camera information data. The camera information data is sent as a text in a HTML document, i.e., as the body of the response data. In this method, the WWW browser can be a general type browser, and further, necessary camera information can be provided to the user.

The second advantage is that camera information can be displayed in a flexible manner. In the seventh embodiment, the WWW browser determines whether or not to display camera information including a warning message, and in case of displaying the camera information, how to display the camera information. However, in the eighth embodiment, as camera information is edited in an HTML document to be sent as text data, flexible display is possible.

FIG. 27 shows the display in the eighth embodiment. The user inputted a pan angle of 70° into the form. However, actual maximum pan angle of the camera 2111 is 50°. At this time, the WWW server 2112 which found that the designated pan angle is different from the pan angle of the camera information, causes the WWW browser to display a warning message by sending camera information text "Current camera status: pan=500, tilt=10°, zoom =×3 Warning! Designated pan angle exceeds movable range" at step S2709.

It goes without saying that text in another form can be sent, and the display position of the message and/or font can be changed, since the text is based on the HTML format.

The third advantage is that the WWW server 2112 stores camera status and setting information and utilizes them as a part of still-image transfer request processing. If the WWW server 2112 stores camera information as shown in FIG. 21, when the WWW browser designates a pan angle exceeding the movable range, the WWW server 2112 can notify the WWW browser of the fact that the designated pan angle is out of the movable range without accessing the camera control server 2101. Note that, e.g., when a pan angle of 70° is designated, if the WWW server 2112 performs error processing instead of returning an image obtained at a pan angle of 50°, the above method is effective.

Thus, the advantages of the present invention have been described as the seventh and eighth embodiments, however, the present invention is not limited to these embodiments.

For example, data sent to the client is not limited to camera information and image data. It can be various data when a control mechanism sends its information and status information or setting information of the control mechanism itself to the client by using the HTTP protocol.

As described above, according to the seventh and eighth embodiments, in a system including a server which has a control mechanism to output information and a client which issues a control request for the control mechanism to the server, by providing a device which inserts the above information into an HTTP message body and a device which inserts status information or setting information of the control mechanism into an HTTP message header, the client can recognize the status information or setting information of the control mechanism inserted in the HTTP message header. Thus, data on the status information or setting information of the control mechanism besides the above information can be sent to the client without disturbing the operation of a general WWW browser. Further, the client can easily grasps the status of the control mechanism.

Ninth Embodiment

Next, a ninth embodiment will be described as a modification to the eighth embodiment. That is, in the ninth embodiment, the WWW browser (program that operates on the PC 2114 or the like) also accesses the camera control server 2101 via the WWW server 2112.

Note that the construction of the entire system of the ninth embodiment is the same as that in FIG. 19, therefore the explanation of the construction will be omitted. Further, the display window of the WWW browser is the same as that in FIG. 27.

FIG. 29 shows the operation processing procedure of the camera control server according to the ninth embodiment. FIGS. 30 and 31 show the operation processing procedure of the WWW server 2112 according to the ninth embodiment. FIG. 32 shows timings of information transmission/reception among the WWW browser, WWW server and the camera control server.

First, the WWW browser (client) is activated, and it accesses the still-image sample page of the WWW server 2112 in accordance with the instruction by the operator. The still-image simple page is a home page provided for the camera control server 2101.

The WWW server 2112 transfers the first and second windows as show in FIG. 27 to the WWW browser in accordance with the HTTP protocol. Next, the WWW server 2112 accesses the third window.

Among these three windows, at least the second window is formed by using a CGI, accordingly, the result of input by the user into the form can be sent to the WWW server 2112.

The user inputs numerical values into the boxes of the pan, tilt and zoom values, and clicks the "camera control" key with an appropriate pointing device or the like, thus a transfer request for the second window is sent to the WWW server 2112.

That is, the WWW browser (PC 2114) establishes connection with respect to the WWW server 2112 (timing 21401 in FIG. 32), and sends an HTTP request similar to the first and second embodiments (timing 21402).

At this time, the URI indicates a CGI script or a program executed on the WWW server 2112 and parameters to be forwarded to the CGI script, similar to the eighth embodiment. That is, in this example, the CGI script to be executed is "/cgi-bin/still.cgi", and parameters to be forwarded to "/cgi-bin/still.cgi" are "p=20&t=10&z=3" after "?".

To send the HTTP request, the user only input numerical values into the boxes of the pan, tilt and zoom values and depresses (clicks) the camera control key.

The WWW browser encodes the contents of input form into a URI. That is, the WWW browser performs encoding in accordance with the description in the second frame, and sends the URI to the WWW server 2112.

The WWW server 2112 first accepts the connection request from the WWW browser (step S21201), then, receives the HTTP request sent from the WWW browser (step S21202). The WWW server 2112 finds that a CGI script activation request is included in the request, then activates the CGI script and forwards the parameters to the CGI script. The subsequent operation is made by the CGI script.

The CGI script reads a still image and camera information from the camera control server 2101 which has been set as a connection destination in advance.

First, the CGI script establishes connection with the camera control server 2101 (step S21203, timing 21403), and sends a HTTP request, requiring a still image, to the camera control server 2101 (step S21204, timing 21404). The content of the HTTP request is "GET/GetCameraLimit". That is, the WWW server requests the camera control server 2101 to transfer controllable limitation value (within ranges of pan angle, tilt angle and zoom value). Note that other data may be sent as the request, however, it does not relate to the above operation and therefore the explanation of the other data will be omitted.

Note that "GET" indicates a method defining a request processing method, and its meaning is resource request indicated by the following URI. In this example, the CGI script recognizes that the URI is "/GetCameraLimit" requiring the camera control server 2101 for camera status information.

Next, the operation of the camera control server 2101 that has received the HTTP request will be described with reference to FIG. 29.

The camera control server 2101 accepts connection request from the WWW server 2112 (step S21101, timing 21403), thus the connection is completed for communication. Next, the camera control server 2101 receives the HTTP request including above-described "GET/GetCameraLimit" by the communication interface unit 2110 (step S21102, timing 21404).

The HTTP request is sent to the request data interpreter 2108.

The request data interpreter 2108 regards the HTTP request as request data and interprets the HTTP request (step S21103). That is, it is determined whether camera status information or image data transfer is requested, based on whether or not the requested method is "GET", and whether or not the URI includes a character string indicating a camera-status information request or image data request (steps S21104, S21107). Note that various commands such as the character string "GetCameraLimit" indicating camera-status information request and the character string "GetStillImage" indicating image data request, and information on their rules are registered in a table (a non-volatile memory such as a ROM or a hard disk device) provided in the request data interpreter 2108. The request data interpreter 2108 interprets the HTTP request based on the registered information.

If the above conditions are not satisfied, data indicating an error is returned as a HTTP response to the WWW browser (step S21115).

In this case, the HTTP request is the camera-status information request, then the process proceeds to step S21108.

At step S21108, the camera controller 2102 obtains camera status information, and stores the information into the camera status memory 2104.

Thus, as all the data to be returned to the client have been prepared in the above procedure, a procedure to send response data is performed (step S21109).

FIG. 28 shows the format of the response data of the ninth embodiment.

The format of the response data has a header and body, in accordance with the HTTP response format. The header is a text data comprising a plurality of lines. A carriage return (CR) code and a line feed (LF) code are added at the end of each line. To discriminate the header from the body, In this format, only the CR/LF code is inserted as a partition of information.

In FIG. 28, the lines from the first line "HTTP/1.0 200 OK" (CR/LF code is omitted) to the fifth line "Content-length:293" is a message defined by the HTTP format. These lines respectively indicate the response status, the data of the content of the body, the name of the HTTP server, the format of the content of the body and the length of the body.

The lines from the seventh line "Camera-location-pan-til-zoom:20,10,3" and the subsequent lines to the end of the body is status and setting information of the camera 2111.

Next, the respective lines will be described.

The seventh line "Camera-location-pan-til-zoom:20,10,3" indicates the current pan, tilt and zoom values. That is, the pan angle is 20°, the tilt angle is 10° and the zooming ratio is thrice.

The eighth line "Camera-backlight:ON" indicates that backlight correction is ON.

The ninth line "Camera-focus:xxx" indicates that the focus value is "xxx".

The tenth line "Camera-iris:yyy" indicates that the iris value is "yyy".

The eleventh line "Camera-Controllimit-pan-max:50" indicates that the maximum pan value within the camera movable range is 50°. That is, the maximum pan angle is +50° (rightward) and −50° (leftward) (indicated as minimum pan value in the eleventh line).

Similarly, the maximum tilt value is 20° (and −20° as the minimum value), the maximum zoom ratio is 8 times, and the minimum zoom ratio is once (the same size).

The response data generator 2109 first generates a response data header except camera status information (step s21109).

Next, the camera-status insertion unit 2107 inserts the camera status and the setting information into the response data header (step S21110). The camera status and the setting information inserted in the body are read from the camera status memory 2104.

The resulting response data is sent from the communication interface unit 2110 to the WWW server (steps S21116, timing 21405).

Returning to FIG. 30, the description of the WWW server will be continued.

The WWW server 2112 receives and interprets the HTTP response (step S21205).

The format of the response data is recognized by the data format (Content-type) included in the header. In this case, as the response data is in text format (text/plain), the response data is interpreted as response data text, thus camera status information is obtained. This information is stored in the memory so that the information can be used later.

At this time, the WWW server 2112 has become capable of determining whether or not angle information (pan angle, tilt angle and zoom value) requested from the WWW browser exceeds the allowable angle range notified by the camera control server 2101. At step S21207a, if the WWW server determines that the angle information exceeds the allowable angle range, the WWW server sends text notifying that the angle exceeds the allowable angel range, as an HTTP response message, to the WWW browser at step s21207b. Then the process ends.

The WWW server 2112 temporarily releases the communication with the camera control server 2101 (steps S21206, timing 21406).

Later, the WWW server 2112 again establishes connection with the camera control server 2101 for requesting image data (step S21207, timing 21407), and sends an HTTP request (information to which the angle information from the WWW browser is added) to the camera control server 2101 (step S21208, timing 21408). The camera control server 2101 receives the HTTP request and performs image sensing in accordance with the designated angle. If the angle exceeds the allowable range of the camera of the camera control server 2101, the camera control server 2101 cannot meet the request. In such case, the camera control server 2101 performs image sensing at an angle closest to the designated angle.

As the operation processing procedure of the camera control server 2101, the process proceeds from step S21101 to step S21104, similar to the operation processing procedure with respect to camera-status information request. However, as the request is image data request, the process proceeds from step S21104 to S21105.

At step S21105, it is determined whether or not the HTTP request includes parameters for camera control. If the HTTP request includes parameters, the parameters are translated into a command to the camera controller 2102 and sent to the camera controller 2102. The camera controller 2102 controls the camera 2111 in accordance with the command (step S21106). When the control of the camera 2111 has been completed, an image is captured by using the image input unit 2103 (step S21111). The image input unit 2103 may compress the captured image data. The image data is stored into the image memory 2105 (step S21112). Next, at step S21113, a header of response data is generated by using the response data generator 2109. The data format indicates the data format of the image data. Generally the data format is binary format such as JPEG format, however, other formats can be employed.

At step S21114, the image data stored at step S21112 is inserted into the response body by using the image data insertion unit 2106.

The resulting response data is sent from the communication interface unit 2110 as an HTTP response to the WWW server (step S21116, timing 21409).

The WWW server 2112 receives the HTTP response (step S21209), temporarily stores the image data in the HTTP response as a file (step S21210), and releases the connection with the camera control server (step S21211, timing 21410).

Next, at step S21212, it is determined whether or not the obtained camera status information should be sent to the WWW browser based on the data interpreted at step S21205. For example, if the camera control angle (parameters) designated by the user exceeds the camera control range, the camera status information is sent to the browser. In such case, as the above-described third frame, a still-image frame page including the camera status information text and a link to the above image data file in the body is sent (step S21213, timing 21411).

As a result, the still-image sample page as shown in FIG. 27 can be displayed by the WWW browser.

In this case, although the user inputs a pan angle of 70° into the form, the actual pan angle of the camera 2111 is 50°. At this time, the WWW server 2112 finds that the angle indicated by the camera status information obtained from the camera control server 2112 exceeds the limitation of pan angle, then sends a camera-status information text "Current camera status: pan=50°, tilt=10°, zoom =×3 Warning! Designated pan angle exceeds movable range." so that the WWW browser displays the text.

It goes without saying that text of another format can be sent, and the display position of the message and/or font, further, the color of the display can be designated.

If the camera status information is not sent, the camera-status information text is not included in the body, and as the above third frame, the still-image frame page including the link to the image data file is sent (step S21214).

In the HTTP protocol, data having a plurality of "Content-type"s cannot be sent. Text and image data cannot be sent simultaneously. However, HTML is used for displaying these data as one page on the WWW browser.

Accordingly, in this case, the still-image frame page including the camera information text and the link to the image data file in the body is sent as a HTML document.

The WWW browser receives the HTML document, displays a text in accordance with the format of the HTML, and temporarily releases the connection with the WWW server 2112 (timing 21412).

The WWW browser finds the link to the image data file in the HTML document, accesses the WWW server 2112 again to read the image data file. That is, the WWW browser establishes connection with the WWW server 2112 (timing 21413), and sends a HTTP request to read the image data file (timing 21414).

The WWW server 2112 accepts the connection request from the WWW browser (step S21301), and receives the HTTP request (step S21302). The WWW server 2112 recognizes the image data file designated in the URI, and sends the image file stored at step S21210 as a HTTP response (step S21303, timing 21415). As the camera information has been already sent, in accordance with necessity, it is not necessary to insert the camera information in the header of the HTTP response.

Finally, the WWW browser receives the HTTP response, releases the connection with the WWW server 2112 (timing 21416), develops the image data, and displays the image data in an image display area designated by the still-image frame page.

In the ninth embodiment, the WWW server always inquires of the camera control server about information on the limitation of camera control (angle). It may be arranged such that the WWW server inquires about the information on the camera control limitation only at the initial inquiry, and stores the obtained information. In this case, a response on the limitation of the camera control can be returned at any time by reading the stored information.

The advantage of the ninth embodiment will be understood from the operation as described above, however, the present invention is not limited to this embodiment.

For example, data sent to the client is not limited to camera information and image data. It can be various data when a control mechanism sends its information and status information or setting information of the control mechanism itself to a client by using the HTTP protocol.

As described above, according to the ninth embodiment, in a system including a server which has a control mechanism to output information and a client which issues a control request for the control mechanism to the server, by providing a device which inserts status information or setting information of the control mechanism into an HTTP message body, the client can recognize the status information or setting information of the control mechanism inserted in the HTTP message body. Thus, the data on the status information or setting information of the control mechanism besides the above information can be sent to the client without disturbing the operation of a general WWW browser. Further, the client can easily grasps the status of the control mechanism.

Note that in the above embodiments, the Internet using the TCP/IP protocol as a communication protocol has been described, however, the present invention can be applied to any network so far as it is capable of the above communication.

Further, in the present invention, the respective servers and clients require hardware for network connection with a general information processing device (a personal computer, a work station or the like), however, they can be realized by programs which operate on the respective devices.

Accordingly, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, according to the seventh to ninth embodiments, even if the contents of request from the client side exceeds the allowable range of the server, it is possible to make a response to meet the basic portion of the request, and make notification to indicate that the result of the response does not completely meet the request from the client, via a general network.

The present invention is not limited to the above embodiments and various changes and modifications can be made within the spirit and scope of the present invention. Therefore, to appraise the public of the scope of the present invention, the following claims are made.

What is claimed is:

1. A communication method comprising:
   an address-storing step of storing a network address of an object site into a memory;
   an information-storing step of storing control information for a respective image input device of said object site in relation to said network address at a location remote from the object site;
   a reading step of reading an address of a designated site stored in said memory and control information for respective image input device of the designated site;
   an access and control step of generating, on the basis of the address and control information read in said reading step, characters for accessing said designated site and controlling said image input device and of accessing and controlling said designated site using the generated characters, wherein said control information includes an identifier for identifying an item to be controlled of said image input device; and
   a display control step of making a display device to display the generated characters excluding characters corresponding to said control information.

2. The communication method according to claim 1, wherein the address of said site is a URL on the Internet.

3. The communication method according to claim 1, further comprising a reception step of receiving image information from said site to which said control information has been transmitted, wherein said display control step displays the image information.

4. The communication method according to claim 1, further comprising a generating step of generating said control information as control information according to manual designation.

5. The communication method according to claim 1, wherein said image input device inputs a moving image.

6. The communication method according to claim 5, wherein said image input device is a video camera.

7. The communication method according to claim 6, wherein said control information is used for controlling an image sensing angle of said video camera.

8. The communication method according to claim 6, wherein said control information is used for controlling a focal distance of said video camera.

9. The communication method according to claim 6, wherein said control information is used for controlling a shutter speed of said video camera.

10. A storage medium in which said respective steps in claim 1 are computer-readably stored.

11. A communication apparatus comprising:
    address-storing means for storing a network address of an object site;
    information-storing means for storing control information for respective image input device of said object site in relation to said network address at a location remote from the object site;
    reading means for reading an address of a designated site stored by said address-storing means and control information, stored by said information-storing means, for respective image input device of the designated site;
    access and control means for generating, on the basis of the address and control information read by said reading means, characters for accessing said designated site and controlling said image input device and for accessing and controlling said designated site using the generated characters, wherein said control information includes an identifier for identifying an item to be controlled of said image input device; and
    display control means for making a display device to display the generated characters excluding characters corresponding to said control information.

12. The communication apparatus according to claim 11, wherein the address of said site is an address on the Internet.

13. The communication apparatus according to claim 11, further comprising a reception means for receiving image information from said site to which said control information has been transmitted, wherein said display control means displays the image information.

14. The communication apparatus according to claim 11, further comprising generating means for generating said control information as control information according to manual designation.

15. The communication apparatus according to claim 11, wherein said image input device inputs a moving image.

16. The communication apparatus according to claim 15, wherein said image input device is a video camera.

17. The communication apparatus according to claim 16, wherein said control information is used for controlling an image sensing angle of said video camera.

18. The communication method according to claim 16, wherein said control information is used for controlling a focal distance of said video camera.

19. The communication method according to claim 16, wherein said control information is used for controlling a shutter speed of said video camera.

20. A storage medium in which program codes for executing processing by said respective means in claim 11 are computer-readably stored.

21. The method according to claim 2, wherein the identifier is expressed as part of a path name in the URL.

22. The method according to claim 21, wherein the identifier is expressed as part of a resource name in the path name in the URL.

23. The method according to claim 1, wherein the control information is stored separately from the address.

24. The apparatus according to claim 11, wherein the identifier is expressed as part of a path name in the URL.

25. The apparatus according to claim 24, wherein the identifier is expressed as part of a resource name in the path name in the URL.

26. The apparatus according to claim 11, wherein the control information is stored separately from the address.

* * * * *